(12) United States Patent
Nakazawa

(10) Patent No.: US 8,179,541 B2
(45) Date of Patent: May 15, 2012

(54) IMAGE FORMING APPARATUS

(75) Inventor: Shinji Nakazawa, Soraku-gun Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 638 days.

(21) Appl. No.: 12/362,575

(22) Filed: Jan. 30, 2009

(65) Prior Publication Data
US 2009/0201525 A1 Aug. 13, 2009

(30) Foreign Application Priority Data

Feb. 7, 2008 (JP) ................................. 2008-028147

(51) Int. Cl.
*G06F 3/12* (2006.01)
*H04N 1/04* (2006.01)
*G06T 5/00* (2006.01)

(52) U.S. Cl. ....... 358/1.13; 358/488; 358/498; 358/486; 358/3.26

(58) Field of Classification Search .................. 358/486, 358/3.26, 1.13, 488, 498
See application file for complete search history.

(56) References Cited

U.S. PATENT DOCUMENTS

| 2001/0048821 | A1 | 12/2001 | Tomizawa et al. | |
|---|---|---|---|---|
| 2007/0165283 | A1* | 7/2007 | Matsuzaki et al. | ........... 358/3.26 |
| 2007/0229919 | A1* | 10/2007 | Shinagawa | .................... 358/486 |
| 2008/0054555 | A1 | 3/2008 | Atsumi et al. | |

FOREIGN PATENT DOCUMENTS

| JP | 2001-290328 A | 10/2001 |
|---|---|---|
| JP | 2002-014500 | 1/2002 |
| JP | 2003-255799 A | 9/2003 |
| JP | 2004-090284 A | 3/2004 |
| JP | 2005-342943 | 12/2005 |

* cited by examiner

*Primary Examiner* — Charlotte M Baker
*Assistant Examiner* — Justin Katzwhite
(74) *Attorney, Agent, or Firm* — Renner, Otto, Boisselle & Sklar, LLP

(57) ABSTRACT

In continuous printing of plural sheets of recording paper, a controlling section of an image forming apparatus corrects a writing position for a first sheet of recording paper in accordance with an off-center amount detected by a carrying position sensor with respect to the first sheet of recording paper. As for an nth sheet of recording paper, the controlling section corrects the writing position for the nth sheet of recording paper in accordance with an off-center amount $\alpha(n-1)$ detected by the carrying position sensor with respect to an (n−1)th sheet of recording paper. In a case where an absolute value of a difference between an off-center amount $\alpha n$ detected by the carrying position sensor with respect to the nth sheet of recording paper and the off-center amount $\alpha(n-1)$ exceeds a threshold, the controlling section corrects the writing position in accordance with the off-center amount $\alpha n$ and causes an exposure unit to write again the electrostatic latent image at the writing position corrected in accordance with the off-center amount $\alpha n$, instead of writing an electrostatic latent image at the writing position corrected in accordance with the off-center amount $\alpha(n-1)$. This makes it possible to minimize a decrease in printing speed and improve accuracy of a position with which an image is formed on a sheet of recording paper.

9 Claims, 13 Drawing Sheets

IMAGE FORMING APPARATUS

This Nonprovisional application claims priority under 35 U.S.C. §119(a) on Patent Application No. 028147/2008 filed in Japan on Feb. 7, 2008, the entire contents of which are hereby incorporated by reference.

TECHNICAL FIELD

The present invention relates to an image forming apparatus such as a copying machine, a printer, or a multifunction printer.

BACKGROUND ART

An image forming apparatus such as a copying machine, a printer, or a multifunction printer includes a photoreceptor drum, a charging device, an exposure unit, a developing device, and a fixing device. In the image forming apparatus, the charging device uniformly charges a surface of the photoreceptor drum, and the exposure unit exposes the uniformly charged surface of the photoreceptor drum in accordance with image data, thereby forming an electrostatic latent image. Then, the developing device develops the electrostatic latent image with toner. A toner image thus developed is transferred onto a sheet of recording paper carried to an area for the transfer (such an area being hereinafter referred to as "transfer area"), and is fixed onto the sheet of recording paper by the fixing device. In the image forming apparatus, a sheet of recording paper is carried from a paper feeding tray to the transfer area. When the sheet of recording paper is carried, the sheet of recording paper may be misaligned in a direction perpendicular to a carrying direction. This causes variations in the position of images that are formed on sheets of recording paper.

In view of this, Patent Literature 1 describes a technique for detecting that edge of a sheet of recording paper which is oriented in a carrying direction and correcting, in accordance with a result of the detection, a timing at which an electrostatic latent image is written onto a photoreceptor drum.

CITATION LIST

Patent Literature 1
Japanese Patent Application Publication No. 14500/2002 (*Tokukai* 2002-14500; published on Jan. 18, 2002)

Unfortunately, in a case where an image forming apparatus performs, for every sheet of recording paper, detection of misalignment, correction of an exposure position on a photoreceptor drum in accordance with a result of the detection, and writing of an image onto the photoreceptor drum, the timing at which the image starts to be written is delayed. This means an increase in interval between transfers of toner images onto plural sheets of recording paper, i.e., means a hindrance to high-speed printing.

SUMMARY OF INVENTION

An object of the present invention is to provide an image forming apparatus capable of minimizing a decrease in printing speed and improving accuracy of that position on a sheet of recording paper with which an image is formed.

In order to attain the object, an image forming apparatus includes: an image bearing member; an image writing section for writing an electrostatic latent image onto the image bearing member; a transfer section for transferring, onto a sheet of recording paper, an image obtained by developing with a developer the electrostatic latent image written onto the image bearing member; a carrying position detecting section for detecting, on a recording-paper carrying path provided between a paper feeding section for feeding a sheet of recording paper and the transfer section, an amount of misalignment of a sheet of recording paper in a direction perpendicular to a carrying direction; and a correcting section for correcting, in accordance with an amount of misalignment detected by the carrying position detecting section, a writing position at which the image writing section writes an electrostatic latent image onto the image bearing member, in continuous printing of plural sheets of recording paper, the correcting section (i) correcting the writing position for a first sheet of recording paper in accordance with a first amount of misalignment detected by the carrying position detecting section with respect to the first sheet of recording paper, and (ii) correcting the writing position for an nth sheet of recording paper (where n is an integer of not less than 2) in accordance with a second amount of misalignment detected by the carrying position detecting section with respect to the sheets of recording paper up to an (n−1)th sheet of recording paper, wherein, in a case where an absolute value of a difference between (a) a third amount of misalignment detected by the carrying position detecting section with respect to the nth sheet of recording paper and (b) the second amount of misalignment exceeds a threshold, the correcting section corrects the writing position for the nth sheet of recording paper in accordance with the third amount of misalignment and causes the image writing section to again write an electrostatic latent image at the writing position corrected in accordance with the third amount of misalignment, instead of writing an electrostatic latent image at the writing position corrected in accordance with the second amount of misalignment.

The arrangement above makes it possible to form an image without misalignment even on a sheet of recording paper having been accidentally misaligned, and to minimize a decrease in printing speed.

Additional objects, features, and strengths of the present invention will be made clear by the description below. Further, the advantages of the present invention will be evident from the following explanation in reference to the drawings.

DESCRIPTION OF EMBODIMENTS

With reference to FIGS. 1 through 16, the following describes an embodiment of an image forming apparatus of the present invention. The image forming apparatus of the present invention is an apparatus, such as a multifunction printer, a copying machine, or a printer, for forming an image on a sheet of recording paper.

(Overall Arrangement of Image Forming Apparatus)

Figure 2:
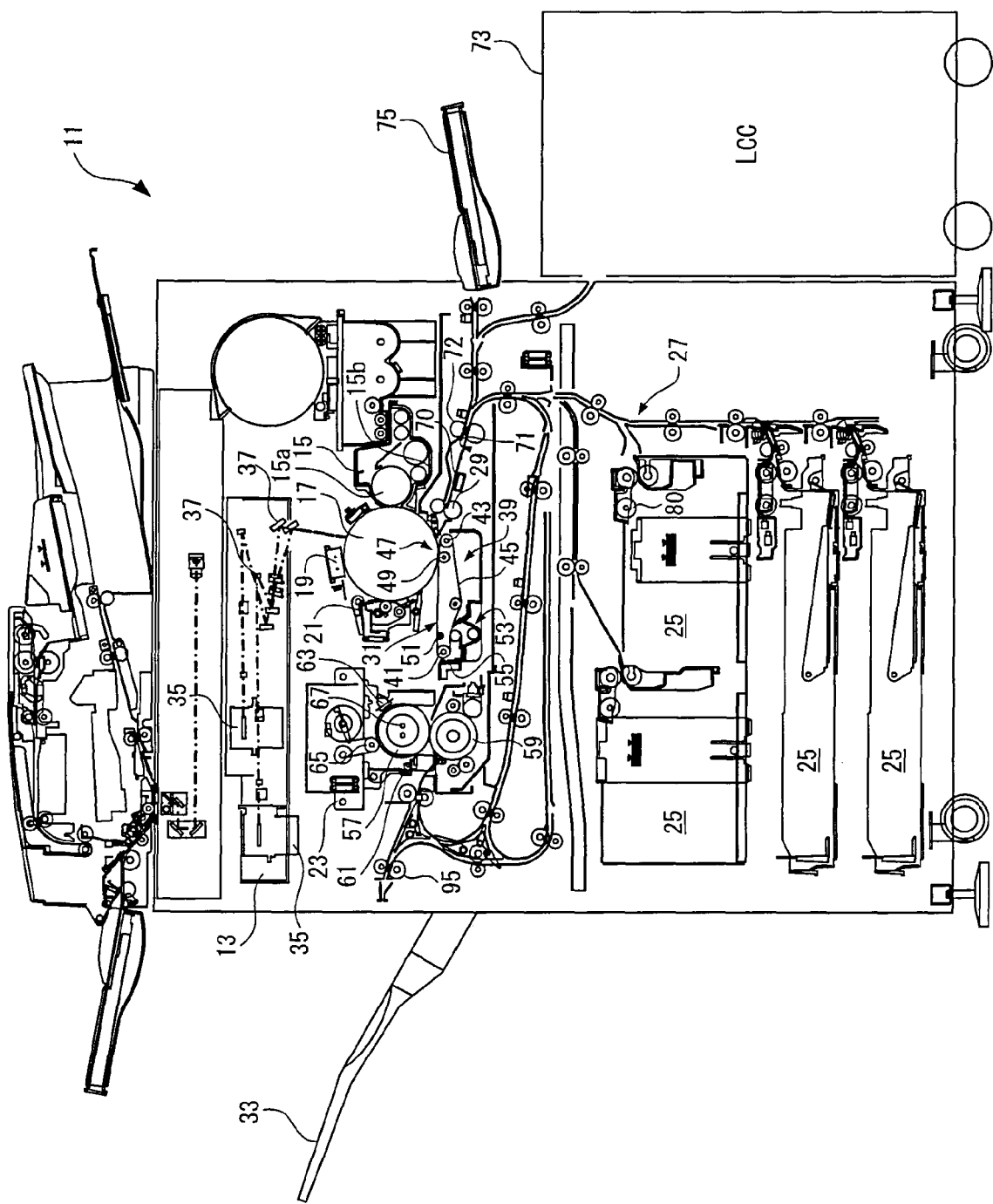
FIG. 2 is a cross-sectional view illustrating the image forming apparatus according to the embodiment of the present invention.

FIG. 2 is a cross-sectional view illustrating an arrangement of an image forming apparatus 11 according to the present embodiment. The image forming apparatus 11 forms a monochrome image on a predetermined sheet (of recording paper) in accordance with image data externally supplied. As illustrated in FIG. 2, the image forming apparatus 11 includes: an exposure unit (image writing section) 13; a developing unit 15; a photoreceptor drum (image bearing member) 17; a charger 19; a cleaner unit 21; a fixing unit (fixing section) 23; paper feeding trays (paper feeding sections) 25; a first paper carrying path 27 extending upward from the paper feeding trays 25; a second paper carrying path 31 extending from an end of the first paper carrying path 27 to a paper output roller (paper output section) 95 via a registration roller 29, a transfer belt 45, and the fixing unit 23; a paper output tray 33, etc.

The charger 19 is charging means for uniformly charging a surface of the photoreceptor drum 17 to a predetermined electric potential. As illustrated in FIG. 2, the charger 19 is a charger of an electrostatic charging type. However, the charger 19 is not limited to such a charger, but also can be a contact roller-type or brush-type charger.

As illustrated in FIG. 2, the exposure unit 13 is a laser scanning unit (LSU) including a laser irradiation section 35 and a reflection mirror 37. Instead of the LSU, the exposure unit 13 can be realized, for example, as an EL writing head or an LED writing head each provided with an array of light-emitting devices.

The surface of the photoreceptor drum 17 is uniformly charged by the charger 19. The exposure unit 13 exposes that position on the uniformly charged surface of the photoreceptor drum 17 which corresponds to the supplied image data. The exposure unit 13 thus forms an electrostatic latent image on the surface of the photoreceptor drum 17 in accordance with the supplied image data. That is, the exposure unit 13 performs image writing with respect to the photoreceptor drum 17. A position at which the exposure unit 13 starts image writing onto the photoreceptor drum 17 (such a position being hereinafter referred to as "image writing position") is corrected for every recording paper. The correcting process of correcting an image writing position is described later in detail.

The developing unit 15 develops with toner an electrostatic latent image formed on the photoreceptor drum 17. After the development and image transfer are performed, the cleaner unit 21 removes and collects toner remaining on the surface of the photoreceptor drum 17.

The developing unit 15 includes a developing tank 15b for storing toner, and a developing roller 15a for supplying the toner stored in the developing tank 15b to the photoreceptor drum 17. The developing roller 15a is provided at a position facing the photoreceptor drum 17, so as to be in close proximity to the photoreceptor drum 17. In order that the developing roller 15a supplies the toner to the photoreceptor drum 17, a voltage equal in polarity to the electrically-charged toner is applied to the developing roller 15a. In contrast, applying to the developing roller 15a a voltage opposite in polarity to the electrically-charged toner causes the toner to remain adhering to the developing roller 15a. This makes it possible to prevent the toner from being supplied from the developing roller 15a to the photoreceptor drum 17.

A toner image thus developed on the photoreceptor drum 17 is transferred onto a sheet of recording paper that is carried on the second paper carrying path 31. A transfer mechanism (transfer section) 39 (which is a transfer belt unit in the image forming apparatus 11) is a mechanism that applies an electric field opposite in polarity to an electric charge of the toner and thereby transfers the toner onto a sheet of recording paper. For example, in a case where an electrostatic latent image has an electric charge having a negative polarity, the transfer mechanism 39 applies an electric field having a positive polarity.

The transfer mechanism 39 in the image forming apparatus 11 includes the transfer belt 45 having a predetermined electrical resistance (falling within a range from $1\times10^9$ to $1\times10^{13}$ Ω·cm). The transfer belt 45 is provided in a tensioned state by use of a driving roller 41, a driven roller 43, and other rollers. Provided in a transfer area 47 in which the photoreceptor drum 17 and the transfer belt 45 come into contact with each other is an elastic electrically-conductive roller 49 to which an electric field for transfer can be applied. The elastic electrically-conductive roller 49 is a roller different from the driving roller 41 and the driven roller 43 and has elasticity. Therefore, the photoreceptor drum 17 and the transfer belt 45 come into contact with each other, so that an interface between the photoreceptor drum 17 and the transfer belt 45 forms not a line, but a plane having a predetermined width (referred to as "transfer nip"). This improves efficiency in transfer onto a sheet of recording paper carried to the transfer area 47.

In order that a toner image developed on the photoreceptor drum 17 is transferred onto a sheet of recording paper, a voltage opposite in polarity to the electrically-charged toner is applied to the elastic electrically-conductive roller 49. In contrast, in a case where a sheet of recording paper is not carried to the transfer mechanism 39, a voltage equal in polarity to the electrically-charged toner, i.e., a voltage whose polarity causes the elastic electrically-conductive roller 49 to repel the toner is applied to the elastic electrically-conductive roller 49. This makes it possible to prevent the toner from being attracted from the photoreceptor drum 17 toward the transfer mechanism 39.

Provided downstream from the transfer area 47 of the transfer belt 45 is a charge removing roller 51 for removing an electric charge from a sheet of recording paper that is electrically charged by a voltage applied when the sheet of recording paper passes through the transfer area 47. As a result, the sheet of recording paper is smoothly carried to a next process. The charge removing roller 51 is provided on a backside of the transfer belt 45.

Furthermore, the transfer mechanism 39 includes a cleaning unit 53 for removing toner adhering to the transfer belt 45 and a charge removing mechanism 55 for removing an electric charge of the transfer belt 45. Methods for removing an electric charge encompass a method in which the transfer belt 45 is grounded via the charge removing mechanism 55, and a positive method in which a voltage opposite in polarity to the electric field for transfer is applied to the transfer belt 45.

A sheet of recording paper onto which a toner image has been transferred in the transfer mechanism 39 is carried to the fixing unit 23. The fixing unit 23 includes a heat roller 57 and a pressure roller 59. Provided on a round outer surface of the heat roller 57 are a sheet separating claw 61, a roller surface temperature detecting member (thermistor) 63, and a roller surface cleaning member 65. Provided inside the heat roller 57 is a heat source 67 for heating a surface of the heat roller 57 to a predetermined temperature (set fixing temperature, which ranges roughly from 160 to 200° C.).

On the other hand, provided on both sides of the pressure roller 59 are pressure members capable of causing the pressure roller 59 to be pressed against the heat roller 57 at a predetermined pressure. As in the case of the heat roller 57, provided on an outer round surface of the pressure roller 59 are a sheet separating claw 61 and a roller surface cleaning member 65.

In a pressure area (referred to as "fixing nip area") between the heat roller 57 and the pressure roller 59, the fixing unit 23 heats, by heat of the surface of the heat roller 57, unfixed toner on a sheet of recording paper carried to the fixing unit 23, thereby melting the unfixed toner. Simultaneously, the fixing unit 23 fixes the unfixed toner onto the sheet of recording paper by an anchor effect with use of pressure applied by the pressure roller 59.

The paper feeding trays 25 are trays for storing sheets of recording paper to be used for image formation. In the image forming apparatus 11 of the present invention, the paper feeding trays 25 are provided below an image forming section 102. A top one of sheets of recording paper stored in a paper feeding tray 25 is picked up by a pickup roller 80 and fed to a main section.

The image forming apparatus 11 of the present invention is made with the aim of high-speed printing and, as such, includes a plurality of paper feeding trays 25, provided as the paper feeding trays 25 below the image forming section 102 each of which is capable of storing 500 to 1500 sheets of recording paper of a standardized size. Provided on a lateral side of the image forming apparatus 11 are (i) a large-capacity paper feeding cassette 73 capable of storing a large number of sheets of recording paper of plural types, and (ii) a manual paper feeding tray (paper feeding section) 75 to be used mainly in printing such as printing on sheets of recording paper of an unstandardized size.

Provided downstream from the end of the first paper carrying path 27 is the registration roller 29 for carrying out alignment between a toner image formed on the photoreceptor drum 17 and a sheet of recording paper carried to the photoreceptor drum 17. Provided between the registration roller 29 and a pre-registration roller 72 positioned upstream from the registration roller 29 are (i) a PIN sensor 71 for detecting the presence or absence of a sheet of recording paper and (ii) a carrying position sensor 70 for detecting misalignment of a sheet of recording paper in a direction perpendicular to a carrying direction.

A paper output roller 95 is a roller for ejecting, to the paper output tray 33, a sheet of recording paper onto which a toner image has been fixed in the fixing unit. In a case where a post-processing apparatus to be described later is attached to the image forming apparatus 11, the paper output roller 95 ejects a sheet of recording paper to the post-processing apparatus.

The paper output tray 33 is provided on a lateral side of the image forming apparatus 11 opposite to the manual paper feeding tray 75. The image forming apparatus 11 is arranged such that, instead of the paper output tray 33, the post-processing apparatus for carrying out post-processing (stapling, punching, etc.) with respect to an ejected recording paper or a plurality of paper output trays 33 can be provided on the lateral side opposite to the manual paper feeding tray 75. In this case, the image forming apparatus 11 and the post-processing apparatus constitute an image forming system.

(Overview of Control of Image Forming Apparatus)

Figure 1:
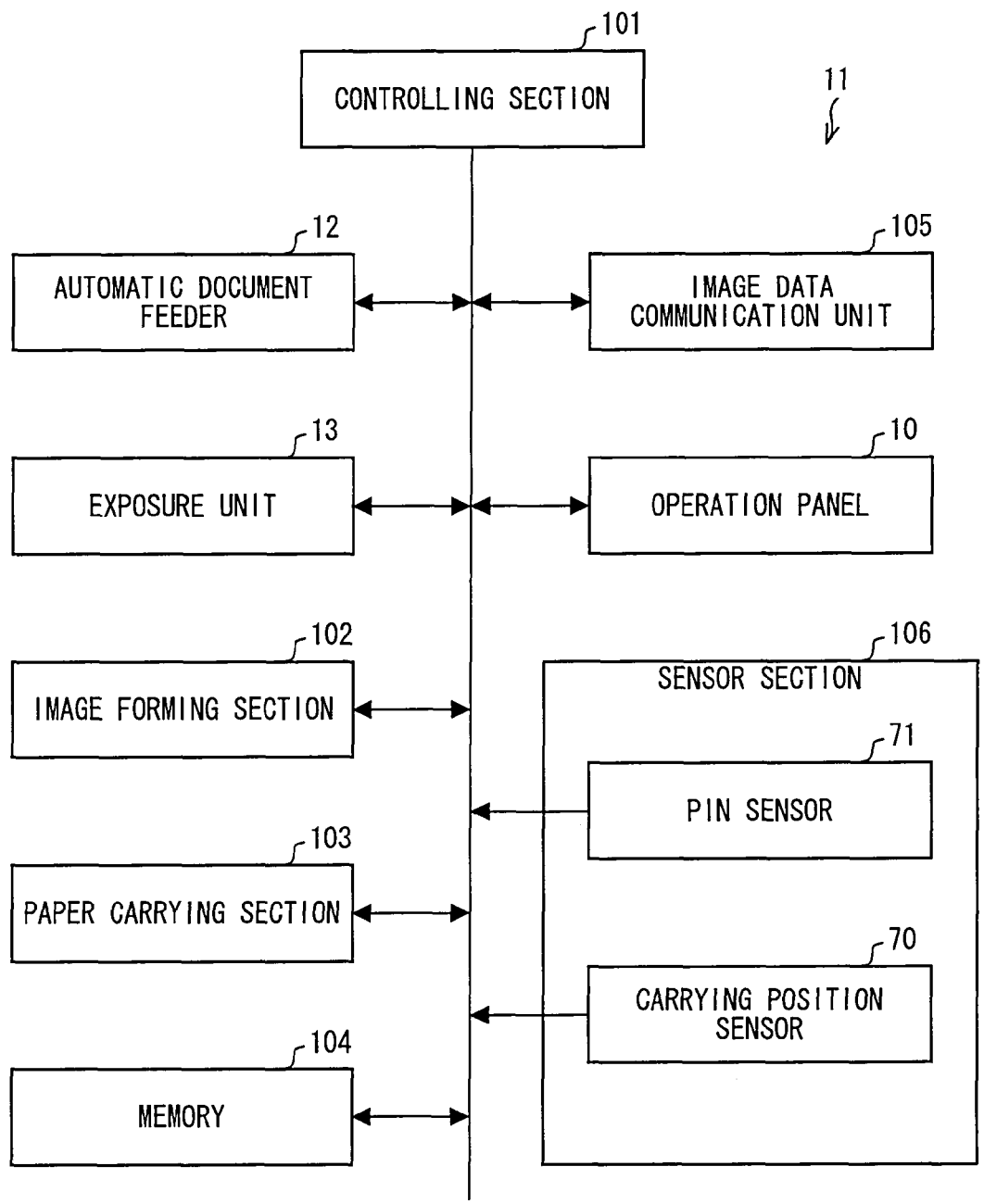
FIG. 1 is a block diagram illustrating an arrangement of an image forming apparatus according to an embodiment of the present invention.

FIG. 1 is a functional block diagram illustrating the image forming apparatus 11. As illustrated in FIG. 1, the image forming apparatus 11 includes an automatic document feeder 12, the exposure unit 13, the image forming section 102, a paper carrying section 103, a memory 104, an image data communication unit 105, an operation panel 10, a sensor section 106, and a controlling section 101.

The automatic document feeder 12 is a device for carrying a document one by one to a reading position in an image reading apparatus (e.g., a scanner) to be used in a copier mode. In a case where the image forming apparatus is a printer, the image forming apparatus does not include the automatic document feeder 12.

The image forming section 102 includes the photoreceptor drum 17, the charger 19, the exposure unit 13, the developing unit 15, the transfer mechanism 39, and the fixing unit 23, all of which have been described above, and driving sources (image forming section driving sources) for driving the components.

The paper carrying section 103 includes the first paper carrying path 27, the second paper carrying path 31, both of which have been described above, a plurality of carrying rollers (which include the registration roller 29 and the pre-registration roller 72) provided along the carrying paths, the pickup roller 80 for picking up a sheet of recording paper from the paper feeding tray 25, and driving sources for driving the carrying rollers and the pickup roller 80.

The memory 104 stores various kinds of control information necessary for controlling each of the driving sources. The memory 104 stores, as a history for every sheet of recording paper, an off-center amount detected by the carrying position sensor 70.

The image data communication unit 105 can communicate with other digital imaging devices via a network. The image data communication unit 105 receives image data, control signals for image formation, etc. from the digital imaging devices.

The operation panel 10 (i) displays information (an operation menu, selection buttons for selecting print processing conditions, etc.) necessary when a user operates the image forming apparatus 11, and (ii) accepts information supplied by a user.

The sensor section 106 includes the PIN sensor 71 and the carrying position sensor 70, both of which have been described above.

The controlling section (correcting section) 101 is connected to each of the sections of the image forming apparatus 11. The controlling section 101 controls the operation of each of the sections. The controlling section 101 includes: for example, a microcomputer; a ROM for storing a control program described as a procedure for a process to be executed by the microcomputer; a RAM for providing a work area; a nonvolatile memory for storing as backup data necessary for performing control; an input circuit including an input buffer and an A/D converter circuit, which input circuit receives input signals from the sensor section 106 and the operation panel 10; an output circuit including drivers for driving loads such as a motor, a solenoid, and a lamp; etc.

The following describes a sheet of recording paper carrying process to be carried out by the controlling section 101. The controlling section 101 selects a sheet of recording paper of a size specified by a print request, and drives a pickup roller 80 of a paper feeding tray 25 storing sheets of recording paper of the selected size. A top recording paper in the paper feeding tray 25 is thus sent to the first paper carrying path 27. The controlling section 101 drives carrying rollers provided along the first paper carrying path 27, whereby the sheet of recording paper is carried to the registration roller 29. Since the rotation of the registration roller 29 is halted by the controlling section 101, the sheet of recording paper is halted by the registration roller 29. The controlling section 101 causes the rotation of the registration roller 29 to be resumed at such a timing that a head of an image formed on the photoreceptor drum 17 is aligned with a position on the sheet of recording paper at which image writing is started. The sheet of recording paper is thus carried to the transfer mechanism. Then, in the transfer mechanism 39, a toner image formed in accordance with the image data is transferred onto the sheet of recording paper. In the fixing unit 23, the toner image thus transferred is fixed onto the sheet of recording paper. Then, the controlling section 101 drives carrying rollers provided along the second paper carrying path 31, whereby the sheet of recording paper is ejected to the paper output tray 33.

In accordance with a processing mode (a copier mode, a printer mode, a FAX mode, etc.) and a print processing method (single-sided printing, double-sided printing, etc.), the controlling section 101 controls a manner of carrying a sheet of recording paper from the fixing unit 23 to the paper output tray 33. For example, in the copier mode, a user normally stays in the vicinity of the image forming apparatus 11. Therefore, the controlling section 101 performs control so that sheets of recording paper are ejected with printed sides up. This is referred to as "face-up output." In contrast, in the printer mode or the FAX mode, a user does not stay in the vicinity of the image forming apparatus 11. Therefore, the controlling section 101 performs control so that sheets of recording paper are ejected in order of page numbers. This is referred to as "face-down output." That is, in the present embodiment, the controlling section 101 has a function of switching, in accordance with a processing mode, between the face-up output and the face-down output. The switching control is performed by use of a plurality of carrying paths and a plurality of branching claws, which plurality of carrying paths and plurality of branching claws are provided along the second paper carrying path 31 between the fixing unit 23 to the paper output tray 33.

Furthermore, based on an amount of misalignment by which a sheet of recording paper carried to the registration roller 29 has been misaligned in the direction perpendicular to the carrying direction, the controlling section 101 corrects an image writing position at which the exposure unit 13 writes an image onto the photoreceptor drum 17. This correcting process is described later in detail.

Based on a time-sharing system, the controlling section 101 concurrently carries out various processes for properly performing image formation.

For example, the controlling section 101 performs such temperature adjustment control that an amount of power supply to the heat source 67 is controlled in accordance with an output of the roller surface temperature detecting member 63, in order that a surface temperature of the heat roller 57 provided in the fixing unit 23 falls within a predetermined range. In a case where the surface temperature of the heat roller 57 does not fall within the predetermined range, the controlling section 101 holds the image forming apparatus 11 in a standby status until the surface temperature falls within the predetermined range.

In addition, the controlling section 101 carries out an image density adjusting process. In the image density adjusting process, a test toner image is formed on the photoreceptor drum 17, and a voltage of the charger 19 and conditions for development are adjusted in accordance with a density of the test toner image read by an optical sensor. While the image density adjusting process is carried out, the controlling section 101 holds the image forming apparatus 11 in the standby status.

Furthermore, the controlling section 101 carries out a raster process of converting image data received by the image data communication unit 105 into bitmap data. That is, the controlling section 101 carries out a process of converting a format of the image data into a format that the image forming apparatus 11 can handle. Before an image forming process, the controlling section 101 carries out the raster process with respect to image data corresponding to one page and, meanwhile, holds the image forming apparatus 11 in the standby status.

In addition, before the image forming process is started, the controlling section 101 causes the photoreceptor drum 17 and the developing tank 15b to preliminarily rotate.

In order to determine whether or not the image forming apparatus 11 is in the standby status, the controlling section 101 stores an adjustment flag in the memory 104. When set to ON, the adjustment flag indicates that the image forming apparatus 11 is in the standby status; when set to OFF, the adjustment flag indicates that the image forming apparatus 11 is not in the standby status. That is, the controlling section 101 sets the adjustment flag to ON in a case where any of the adjusting processes is started. Upon completion of all the adjusting processes that have been carried out, the controlling section 101 sets the adjustment flag to OFF.

(Arrangement of Sensor)

The following describes in detail the correcting process of correcting an image writing position on the photoreceptor drum 17. The correcting process is a feature of the present invention. The correcting process of correcting an image writing position on the photoreceptor drum 17 is carried out in accordance with an output of the carrying position sensor 70.

Figure 3:
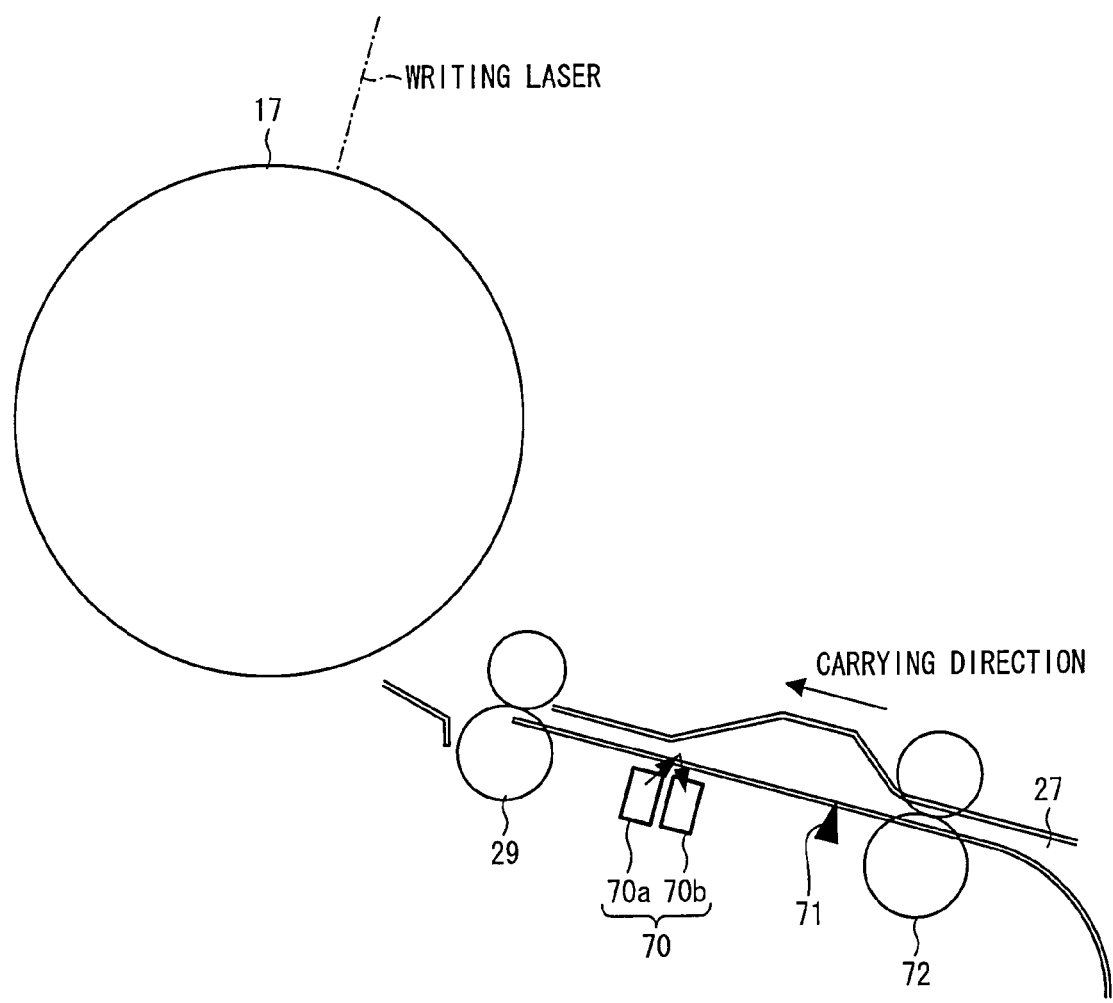
FIG. 3 illustrates an arrangement of a photoreceptor drum and a paper carrying path provided upstream from the photoreceptor drum as viewed from the front of the image forming apparatus.
Figure 4:
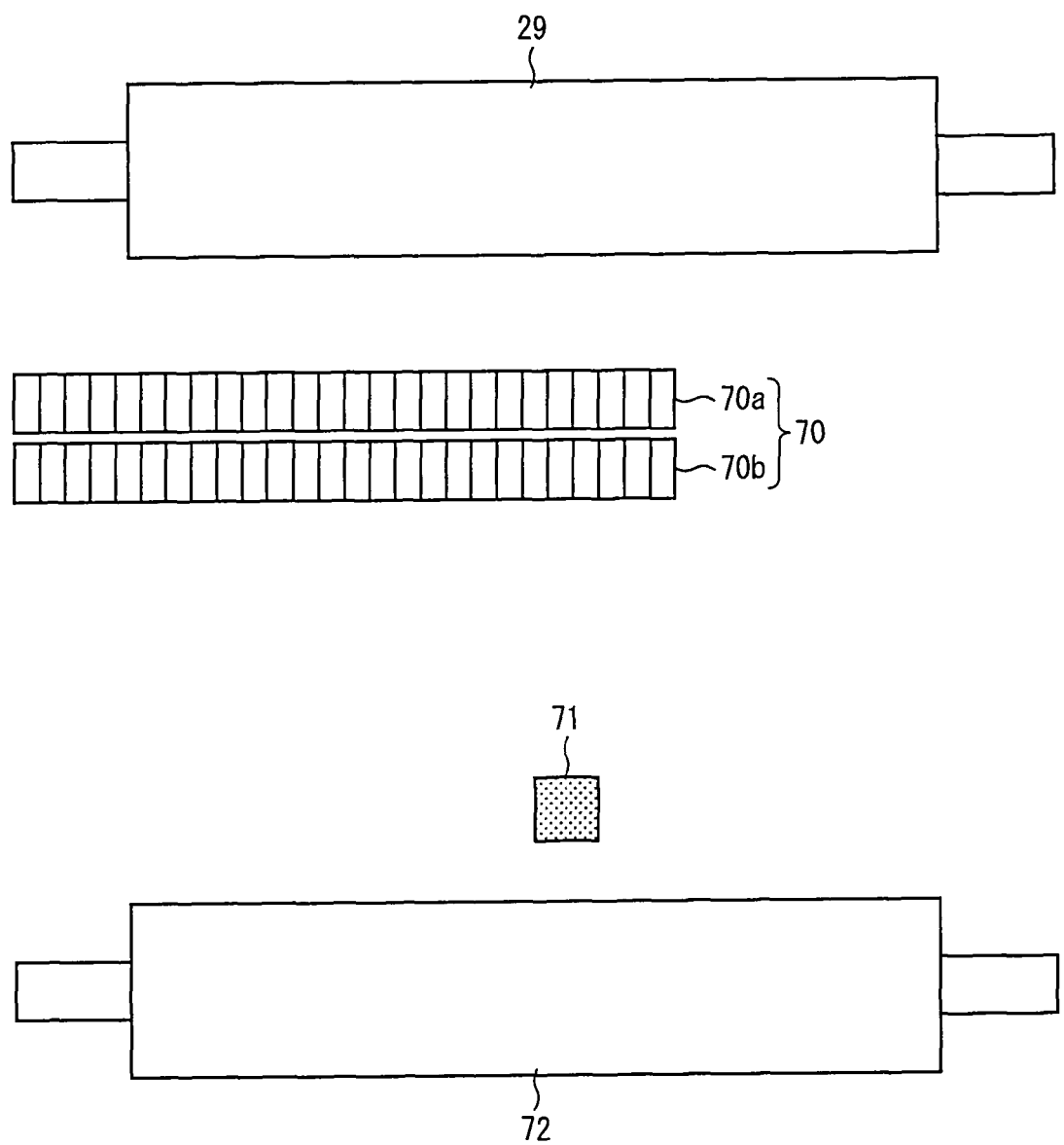
FIG. 4 illustrates an arrangement between a registration roller and a pre-registration roller as viewed from above the image forming apparatus.

First, with reference to FIGS. 3 and 4, the following describes the carrying position sensor 70 and an arrangement of the periphery of the carrying position sensor 70. FIG. 3 illustrates an arrangement of the photoreceptor 17 and the paper carrying paths 27 and 31 provided upstream from the photoreceptor drum 17, as viewed from the front of the image forming apparatus 11. FIG. 4 illustrates an arrangement between the registration roller 29 and the pre-registration roller 72 as viewed from above the image forming apparatus 11.

As illustrated in FIG. 3, the registration roller 29 is provided upstream from the photoreceptor drum 17. The PIN sensor 71 and the carrying position sensor 70 are provided in the carrying direction in this order so as to be positioned between the registration roller 29 and the pre-registration roller 72, which is the first roller provided further upstream from the registration roller 29. That is, the pre-registration roller 72, the PIN sensor 71, the carrying position sensor 70, the registration roller 29, and the photoreceptor drum 17 are provided in the carrying direction in this order.

A length of a side, which is parallel to the carrying direction, of a sheet of recording paper is set longer than a distance between the registration roller 29 and the pre-registration roller 72. This causes a sheet of recording paper to be held between the registration roller 29 and the pre-registration roller 72.

The PIN sensor 71 is a sensor for detecting whether or not a sheet of recording paper exists on the first paper carrying path 27 above the PIN sensor 71. The PIN sensor 71 is realized as a reflective optical sensor, for example. The PIN sensor 71 outputs, to the controlling section 101, a signal for notifying the presence or absence of a sheet of recording paper. In the present embodiment, it is assumed that the PIN sensor 71 outputs an ON signal in the presence of a sheet of recording paper and outputs an OFF signal in the absence of a sheet of recording paper.

The carrying position sensor 70 is a sensor for detecting an amount of misalignment (an off-center amount a) by which a sheet of recording paper held and halted by the registration roller 29 and the pre-registration roller 72 has been misaligned from a reference position α0 (to be described later) in the direction perpendicular to the carrying direction.

The carrying position sensor 70 includes (i) an LED section 70a having a plurality of LEDs (light-emitting diodes) arrayed in the direction perpendicular to the carrying direction of a sheet of recording paper, and (ii) a CIS section 70b including a plurality of CISs (Contact Image Sensors) provided upstream from the plurality of LEDs. Light emitted from an LED is reflected by a sheet of recording paper, and detected by a corresponding CIS. Therefore, a side edge (i.e., a side along the carrying direction) of a sheet of recording paper is indicated by a boundary between a CIS that detects reflected light from the sheet of recording paper and a CIS that does not detect reflected light. This allows the carrying position sensor 70 to detect a position of a side edge of a sheet of recording paper. Then, the carrying position sensor 70 finds an off-center amount an, which indicates a difference between a detected position of a side edge of the nth sheet of recording paper and the reference position α0 (to be described later), i.e., a position of a reference side edge. The carrying position sensor 70 outputs the off-center amount αn thus found to the controlling section 101.

As illustrated in FIG. 4, the carrying position sensor 70 is positioned so as to detect one side edge of a sheet of recording paper that is carried on the first paper carrying path 27. Sheets of recording paper to be carried on the first paper carrying path 27 come in several paper sizes. Therefore, the carrying position sensor 70 is positioned so as to cover a range from a position through which one side edge of a sheet of recording paper (e.g., a postcard-sized sheet) having a minimum width in the direction perpendicular to the carrying direction is expected to pass and a position through which one side edge of a sheet of recording paper (e.g., an A-4 size sheet placed in portrait orientation) having a maximum width in the direction perpendicular to the carrying direction is expected to pass. This allows the carrying position sensor 70 to detect an off-center amount, with respect to a sheet of recording paper having a width, in the direction perpendicular to the carrying direction, up to the maximum width.

The carrying position sensor 70 is positioned in the vicinity of the registration roller 29. That is, the carrying position sensor 70 and the transfer area 47 are close to each other. Therefore, an off-center amount found at a position of the carrying position sensor 70 is almost equal to an off-center amount found in the transfer area 47. This makes it possible to detect the off-center amount in the transfer area 47 with higher accuracy.

(Overview of Correcting Process of Correcting Image Writing Position)

With reference to FIGS. 5 through 8, the following describes an overview of the correcting process of correcting an image writing position on the photoreceptor drum 17.

First, an initial setting of an image writing position is carried out in manufacturing of the image forming apparatus 11. Immediately after the manufacturing of the image forming apparatus 11, a test pattern image is formed on a sheet of recording paper (i.e., test printing is carried out) without adjustment. In the test printing, the controlling section 101 causes the carrying position sensor 70 to detect a position of a side edge of the sheet of recording paper, and stores the position in the memory 104 as the reference position α0.

Figure 5:
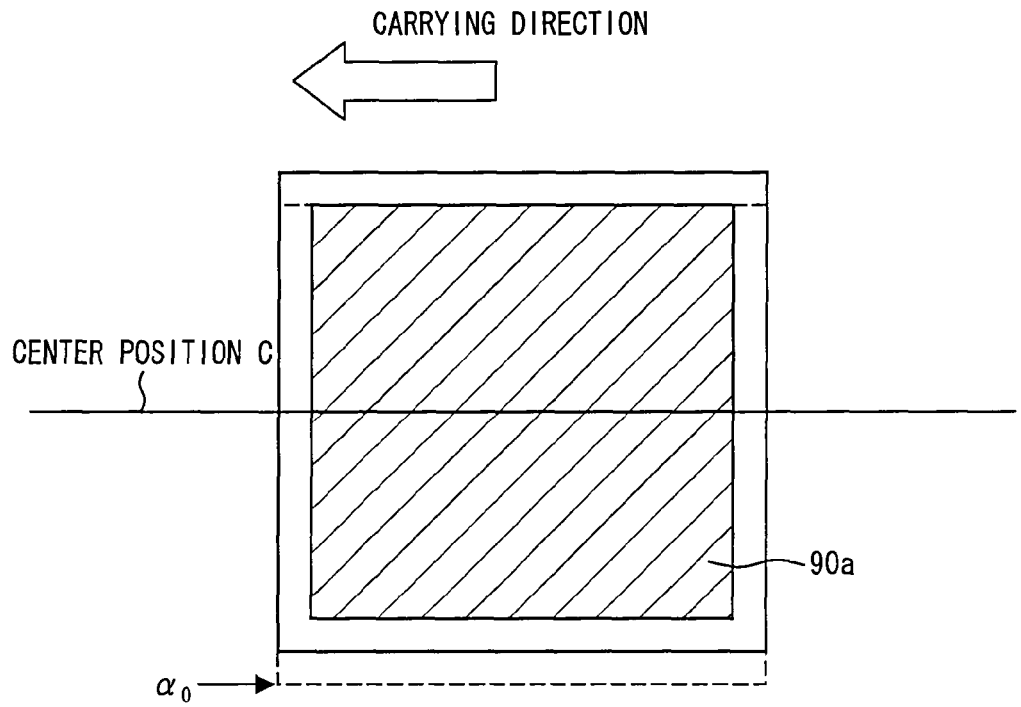
FIG. 5 illustrates a test pattern image formed on a sheet of recording paper in test printing.

FIG. 5 illustrates a test pattern image 90a formed on a sheet of recording paper in test printing. In FIG. 5, a center position C indicates the center of the image 90a, formed on the photoreceptor drum 17 in the test printing without adjustment, in the direction perpendicular to the carrying direction of the sheet of recording paper. The same holds true for FIGS. 6 through 8. In FIG. 5, a position indicated by a solid line is an ideal position of the sheet of recording paper with respect to a position of the test pattern image 90a formed on the photoreceptor drum 17. That is, a test pattern image 90a is formed at a target position on the sheet of recording paper (e.g., the center of the sheet of recording paper) in a case where the sheet of recording paper is carried to the position indicated by the solid line. In the test printing, however, the sheet of recording paper is so carried that a side edge passes through the reference position α0, as detected by the carrying position sensor 70. In FIG. 5, a dotted line indicates a position of the sheet of recording paper that is actually carried. Assume that, as illustrated in FIG. 5, a sheet of recording paper is carried with misalignment toward the front (i.e., downward in FIG. 5) of the image forming apparatus 11.

Figure 6:
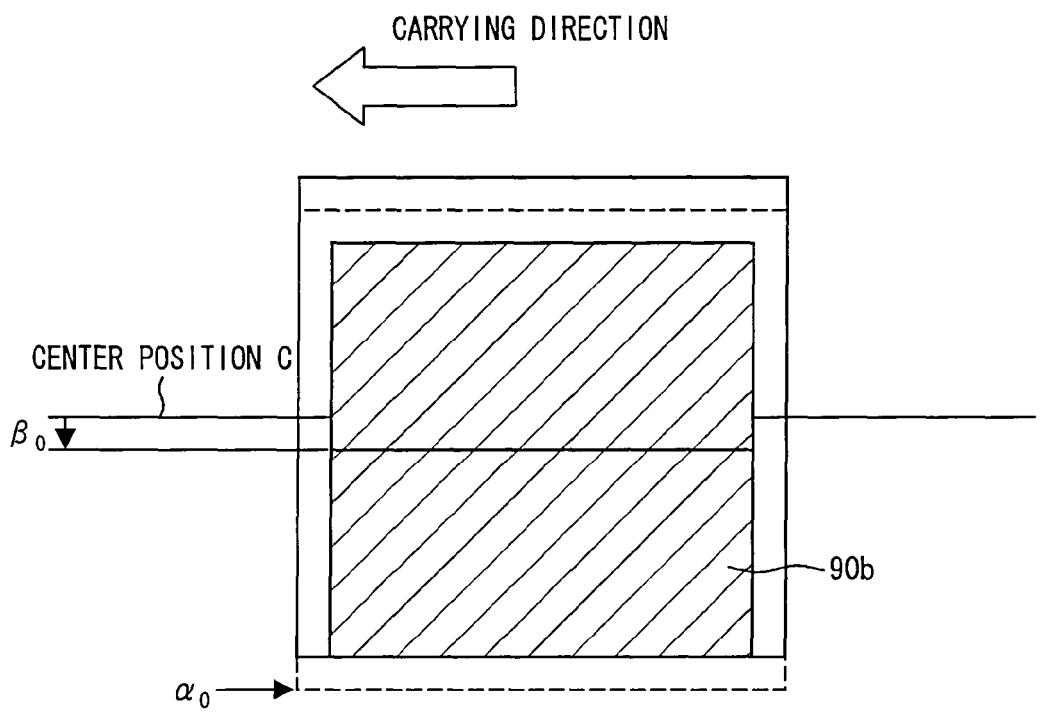
FIG. 6 illustrates a reference correction amount $\beta 0$ that is found from the test pattern image formed on the sheet of recording paper in the test printing.

In accordance with the carrying position of the printed recording paper (i.e., the sheet of recording paper indicated by the dotted line in FIG. 5), a person who carries out settings visually determines the reference correction amount β0 by which an image writing position on the photoreceptor drum 17 is corrected. That is, as illustrated in FIG. 6, it is only necessary to set, as the reference correction amount β0, an amount of misalignment between (i) the center of an image 90b to be formed at a desired position on the sheet of recording paper (indicated by the dotted line in FIG. 5) carried so that the side edge passes through the reference position α0 and (ii) the center (the center position C) of the test pattern image 90a formed in the test printing. Then, the person who carries out settings operates the operation panel 10 in order to store the reference correction amount β0 in the memory 104.

The controlling section 101 thus corrects the image writing position on the photoreceptor drum 17, using the reference position α0 and the reference correction amount β0, which have been stored in the memory 104. The test printing is carried out for each paper size. The memory 104 stores the reference position α0 and the reference correction amount β0 for each paper size.

In continuous printing of plural sheets of recording paper, according to the present embodiment, the correcting section 101 (i) forms an image on the first sheet of recording paper after correcting the image writing position in accordance with an output produced by the carrying position sensor 70 with respect to the first sheet of recoding paper, and (ii) forms an image on the nth sheet of recording paper (where n is an integer of not less than 2) after correcting the image writing position in accordance with an output produced by the carrying position sensor 70 with respect to printed sheets of recording paper up to the (n−1)th sheet of recording paper.

Specifically, when the first one of the sheets of recording paper to be continuously printed reaches the carrying position sensor 70, the controlling section 101 causes the carrying position sensor 70 to detect a position A1 of a side edge of the first recording paper. Then, the carrying position sensor 70 finds an off-center amount α1, which is a difference between the position A1 and the reference position α0 stored in the memory 104, and the off-center amount α1 thus found is stored in the memory 104. A plus sign is given to an absolute value of the off-center amount α1 in a case where the position A1 is closer to a front side of the image forming apparatus 11 than the reference position α0; A minus sign is given to an absolute value of the off-center amount α1 in a case where the position A1 is closer to a rear side of the image forming apparatus 11 than the reference position α0.

Figure 7:
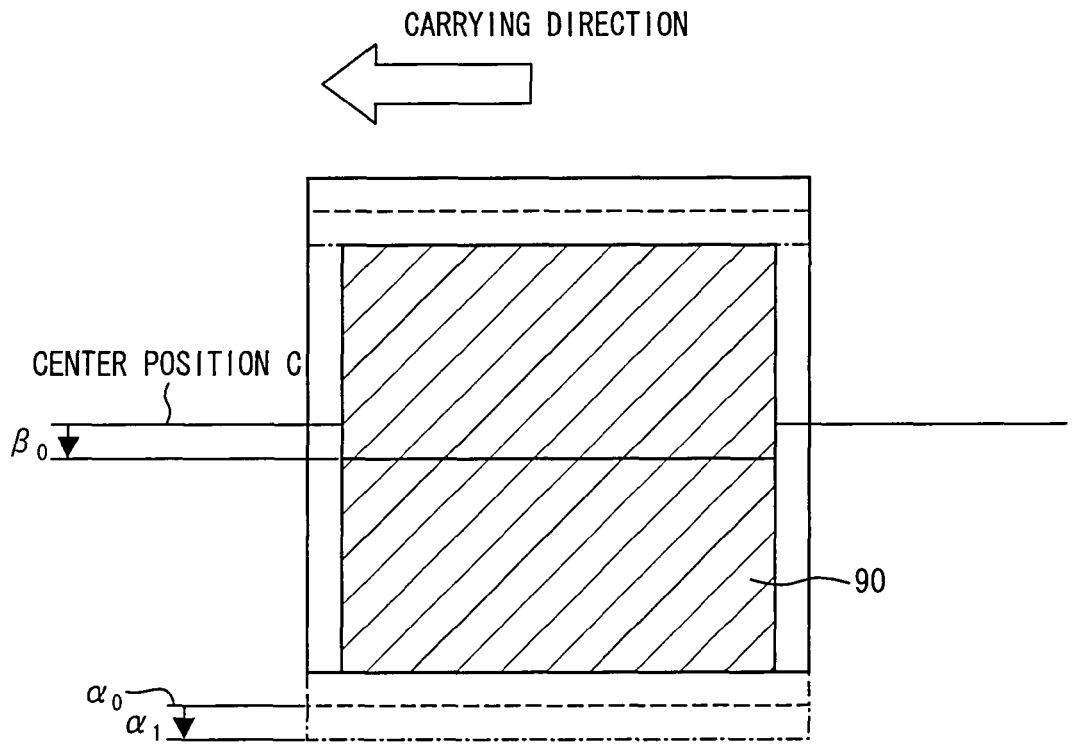
FIG. 7 illustrates a position of an image formed on a sheet of recording paper in a case where an image writing position is corrected by the reference correction amount $\beta 0$.

FIG. 7 illustrates a position of an image formed on a sheet of recording paper in a case where the image writing position on the photoreceptor drum 17 is corrected by the reference correction amount β0 stored in the memory 104. As illustrated in FIG. 7, in a case where the sheet of recording paper is positioned at the same position as the sheet of recording paper of the test printing (i.e., at a position, illustrated by a dotted line in FIG. 7, where a side edge of the sheet of recording paper is at the reference position α0), correcting the image writing position by the reference correction amount β0 makes it possible to position an image at a desired position on the sheet of recording paper.

However, in a case where the sheet of recording paper is misaligned from the reference position α0 by the off-center amount α1, the sheet of recording paper is positioned at a position indicated by a dashed line. Therefore, correcting the image writing position by the reference correction amount β0 results in an image 90 formed at a position misaligned from a desired position on the sheet of recording paper.

Figure 8:
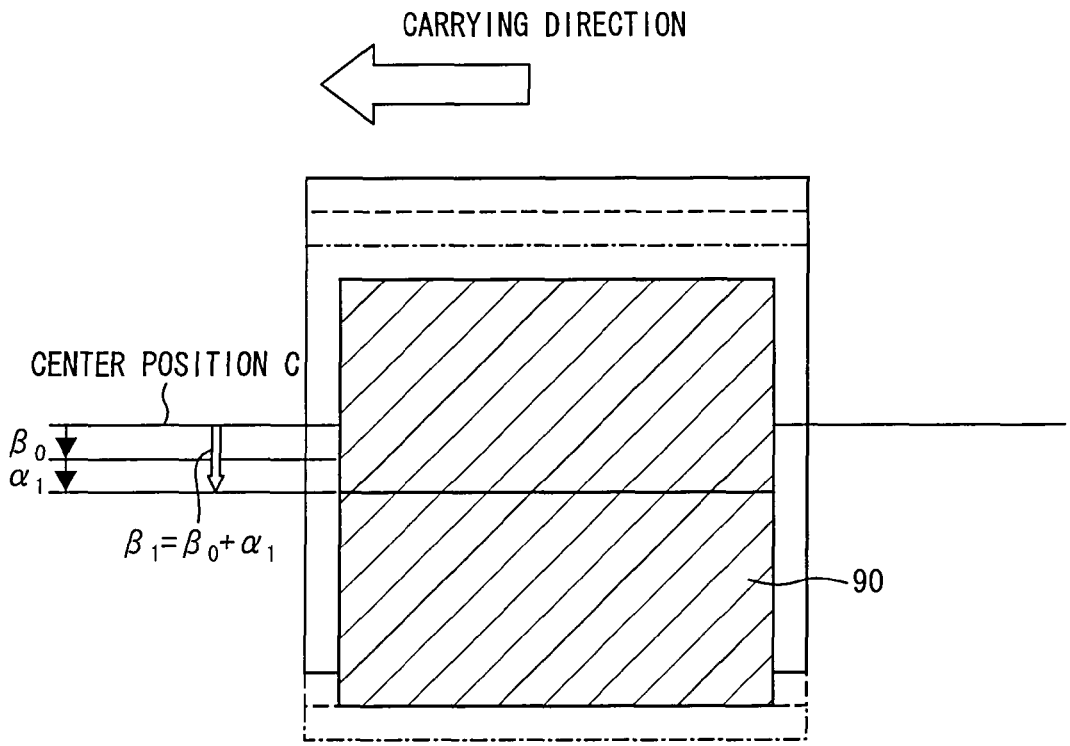
FIG. 8 illustrates a position of an image printed on a sheet of recording paper in a case where an image writing position is corrected by a correction amount β1.

As such, the controlling section 101 finds a correction amount β1 by the equation β1=β0+α1 and corrects the image writing position on the photoreceptor drum 17 by the correction amount β1. FIG. 8 illustrates a position of the image 90 formed on the sheet of recording paper in a case where the image writing position is corrected by the correction amount β1. As illustrated in FIG. 8, the image 90 is formed at a desired position on the sheet of recording paper (the sheet of recording paper is indicated by a dashed line) misaligned from the reference position α0 by the off-center amount α1.

Thus, for the first one of the sheets of recording paper to be continuously printed, the controlling section 101 determines, in accordance with a result obtained by the carrying position sensor 70 with respect to the sheet of recording paper, a correction amount by which an image writing position is corrected. In accordance with the correction amount thus determined, the controlling section 101 starts image writing with respect to the photoreceptor drum 17. Then, the controlling section 101 drives the registration roller 29 and the pre-registration roller 72 at such a timing that a head of the image formed on the photoreceptor drum 17 and a head of the sheet of recording paper are displaced from each other by a distance of a desired margin. This prevents the image from being misaligned on the sheet of recording paper.

As for the second or subsequent one of the sheets of recording paper to be continuously printed, the image writing position is corrected in accordance with a result obtained by the carrying position sensor 70 with respect to the previous sheet of recording paper on which the image has been formed.

That is, when the nth sheet of recording paper reaches the carrying position sensor 70, the controlling section 101 causes the carrying position sensor 70 to detect a position An of a side edge of the nth sheet of recording paper. Then, the carrying position sensor 70 finds an off-center amount αn, which is a difference between the position An and the reference position α0 stored in the memory 104, and the off-center amount αn thus found is stored in the memory 104. Then, the controlling section 101 determines a correction amount βn by which an image writing position is corrected for the nth sheet of recording paper (where n is an integer of not less than 2). The correction amount βn is determined by the equation βn=β0+α(n−1) with use of the off-center amount α(n−1) of the previous sheet of recording paper.

Thus, for the second or subsequent sheet of recording paper, the correction amount is determined in accordance with a position detected by the carrying position sensor 70 with respect to the previous sheet of recording paper. This makes it possible to start image writing before the carrying position sensor 70 detects an amount of misalignment of the current sheet of recording paper. This allows a reduction in time until the start of image writing. As a result, this allows high-speed printing. In continuous printing, generally, an amount of misalignment in the direction perpendicular to the carrying direction hardly varies between two sheets of recording paper that are sequentially carried, provided the sheets of recording paper are stacked in the paper feeding tray in a sufficiently neat manner. Therefore, in most cases, it is possible to form an image at a desired position on a sheet of recording paper even if an image writing position is corrected in accordance with an output produced by the carrying position sensor 70 with respect to the previous sheet of recording paper.

However, in a case where sheets of recording paper are not stacked in the paper feeding tray in a sufficiently neat manner, correcting an image writing position in accordance with the off-center amount of the previous sheet of recording paper causes an increase in amount of misalignment.

In view of this, the controlling section 101 carries out the following process in the present embodiment. First, as described above, before the carrying position sensor 70 detects the off-center amount αn of the nth sheet of recording paper (where n is an integer of not less than 2) in the continuous printing, the controlling section 101 causes the image writing section to start image writing that is based on the off-center amount α(n−1) of the (n−1)th recording paper. After the off-center amount αn of the nth recording paper is detected by the carrying position sensor 70, the controlling section 101 determines whether or not an absolute value Δα of a difference between the off-center amounts αn and α(n−1) exceeds a threshold αth, which is stored in the memory 104 in advance. The threshold αth is set in advance as an upper limit of an allowable range of amounts of misalignment of an image against a sheet of recording paper. The threshold αth is set to 0.5 mm, for example.

In a case where the absolute value Δα is equal to or less than the threshold αth, an amount of misalignment of an image falls within the allowable range. Therefore, the controlling section 101 continues the already-started image writing process of writing the image onto the photoreceptor drum 17 for the nth sheet of recording paper.

In contrast, in a case where the absolute value $\Delta\alpha$ exceeds the threshold $\alpha$th, the absolute value $\Delta\alpha$ indicates that a sheet of recording paper has been accidentally misaligned for some reason. In this case, the controlling section 101 causes the image writing section to stop the already-started image writing process of writing the image onto the photoreceptor drum 17 for the nth sheet of recording paper. Then, after having waited for a predetermined period of time since the start time of the image writing process thus stopped, the controlling section 101 causes the image writing section to resume image writing. In this case, based on the off-center amount $\alpha$n of the nth recording paper, the controlling section 101 finds, by the equation $\beta n=\beta 0+\alpha n$, the correction amount $\beta n$ by which the image writing position is corrected for the nth sheet of recording paper.

The process above makes it possible to form an image at a desired position on a sheet of recording paper even if the sheet of recording paper has been accidentally misaligned for some reason. In addition, in a case where the current sheet of recording paper has not been accidentally misaligned, i.e., in a case where the absolute value of a difference between an amount of misalignment of the previous sheet of recording paper and the amount of misalignment of the current sheet of recording paper is equal to or less than the threshold $\alpha$th, a toner image formed in an image writing process started before the off-center amount of the current sheet of recording paper is detected is transferred onto the current sheet recording paper. As a result, this improves speed in printing on a sheet of recording paper that has not been accidentally misaligned.

According to the present embodiment, as described above, it is possible to form an image without misalignment even on a sheet of recording paper having been accidentally misaligned, and to minimize a decrease in printing speed.

Set as the predetermined period of time, for which the controlling section 101 waits until the controlling section 101 causes the image writing section to resume image writing, is a period of time that is equal to or longer than a period of time required to remove a written toner image from the photoreceptor drum 17. The predetermined period of time is preferably a single cycle of image formation in continuous printing. The single cycle (predetermined time) corresponds to an interval between timings at which sheets of recording paper are picked up from a paper feeding tray in continuous printing without any troubles. The single cycle (hereinafter, referred to as "time t0") is stored in the memory 104 in advance. The controlling section 101 causes each of the sections of the image forming apparatus 11 to operate in synchronization with the single cycle.

Employing the time t0, which is a cycle of image formation in continuous printing, as the predetermined period of time makes it possible to surely remove a toner image written onto the photoreceptor drum 17. In addition, this makes it possible to prevent desynchronization of timings in operation of the sections of the image forming apparatus 11.

The threshold $\alpha$th stored in the memory 104 can be changed through user operation via the operation panel 10. In addition, the threshold $\alpha$th can be set for every paper feeding tray.

For example, a user may set, in a given tray (e.g., in the manual paper feeding tray 75) selected from the plurality of paper feeding trays 25 and the manual paper feeding tray 75, a sheet of recording paper having an image formed only on one side thereof (i.e., a printed recording paper). In this case, the user sets the sheet of recording paper in the tray so that the other side on which no image has been formed is subjected to printing. In most cases, the formation of an image on such a printed recording paper does not require alignment with high accuracy. As such, the arrangement in which the threshold $\alpha$th can be set for every paper feeding tray makes it possible to set the threshold $\alpha$th high for a paper feeding tray for holding sheets of recording paper that do not require alignment with very high accuracy. This makes it possible to reduce the frequency of resumption of image writing, thereby realizing a further increase in speed.

(Flow of Correcting Process of Correcting Image Writing Position)

Figure 9:
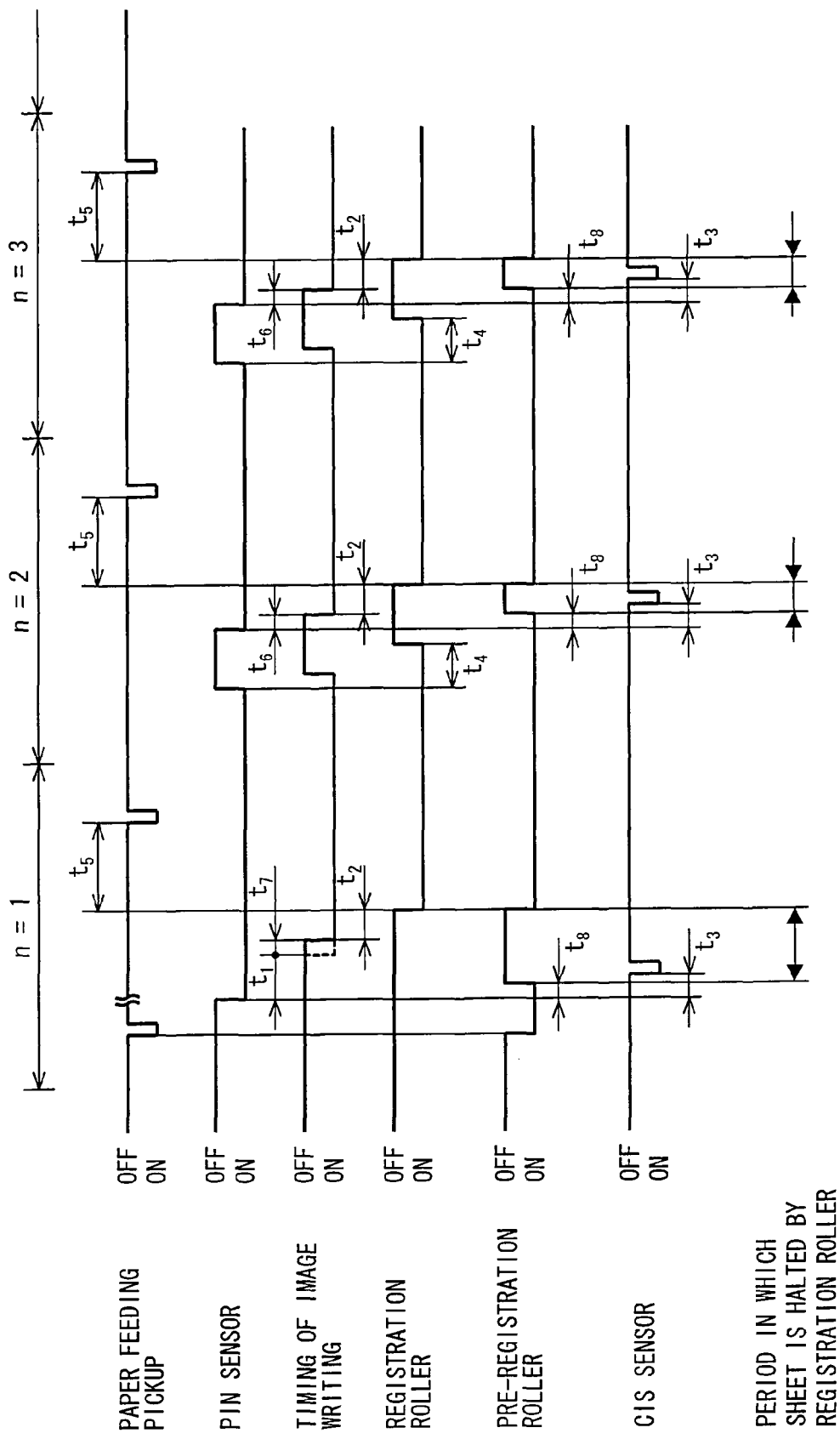
FIG. 9 is a timing chart illustrating detection timings of a sensor section, driving timings of a paper carrying section, and timings of image writing, in continuous printing.
Figure 10:
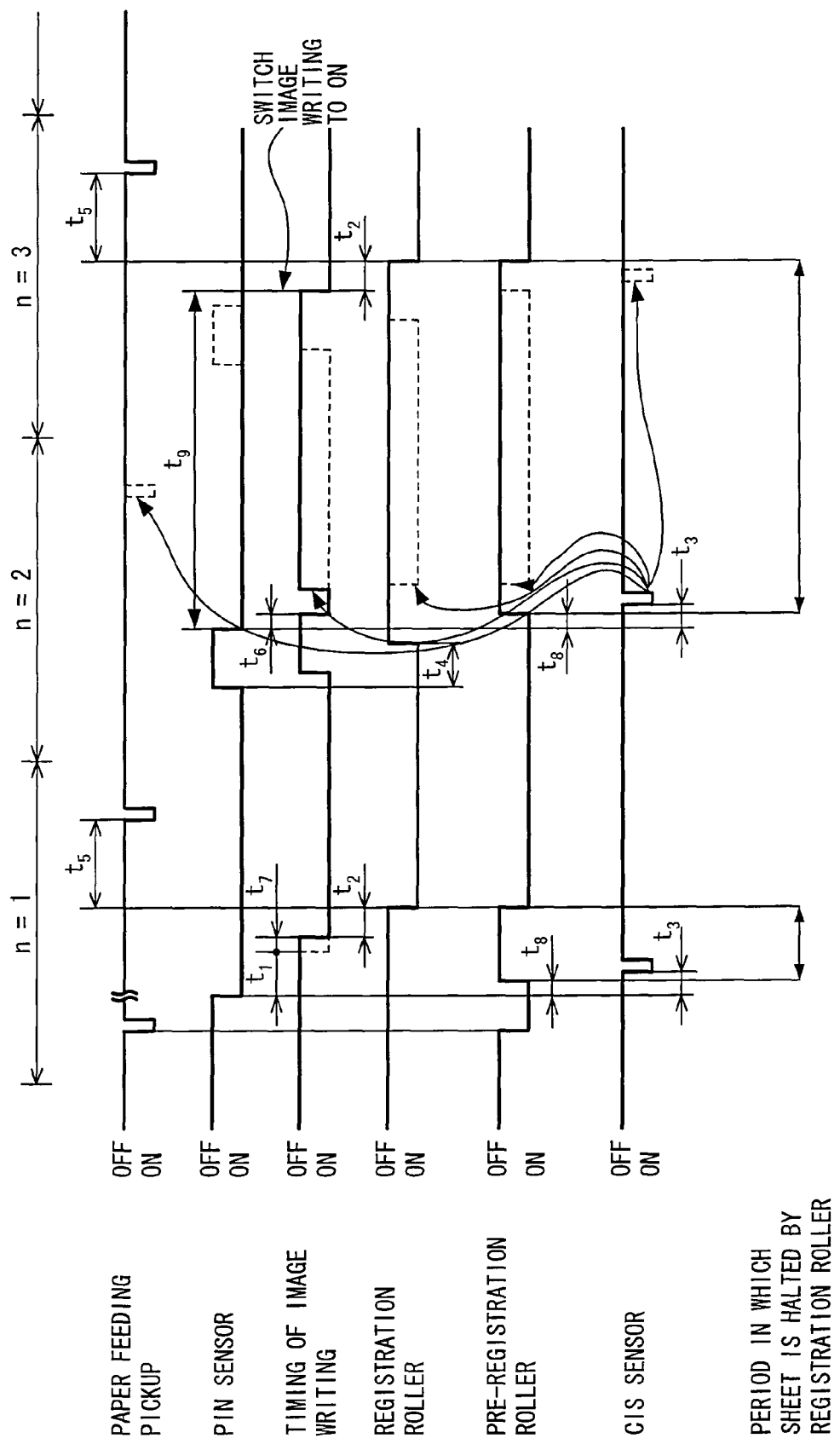
FIG. 10 is a timing chart illustrating detection timings of the sensor section, driving timings of the paper carrying section, and timings of image writing, in a case where an absolute value Δα of a difference between off-center amounts αn and α(n−1) exceeds a threshold αth.
Figure 11:
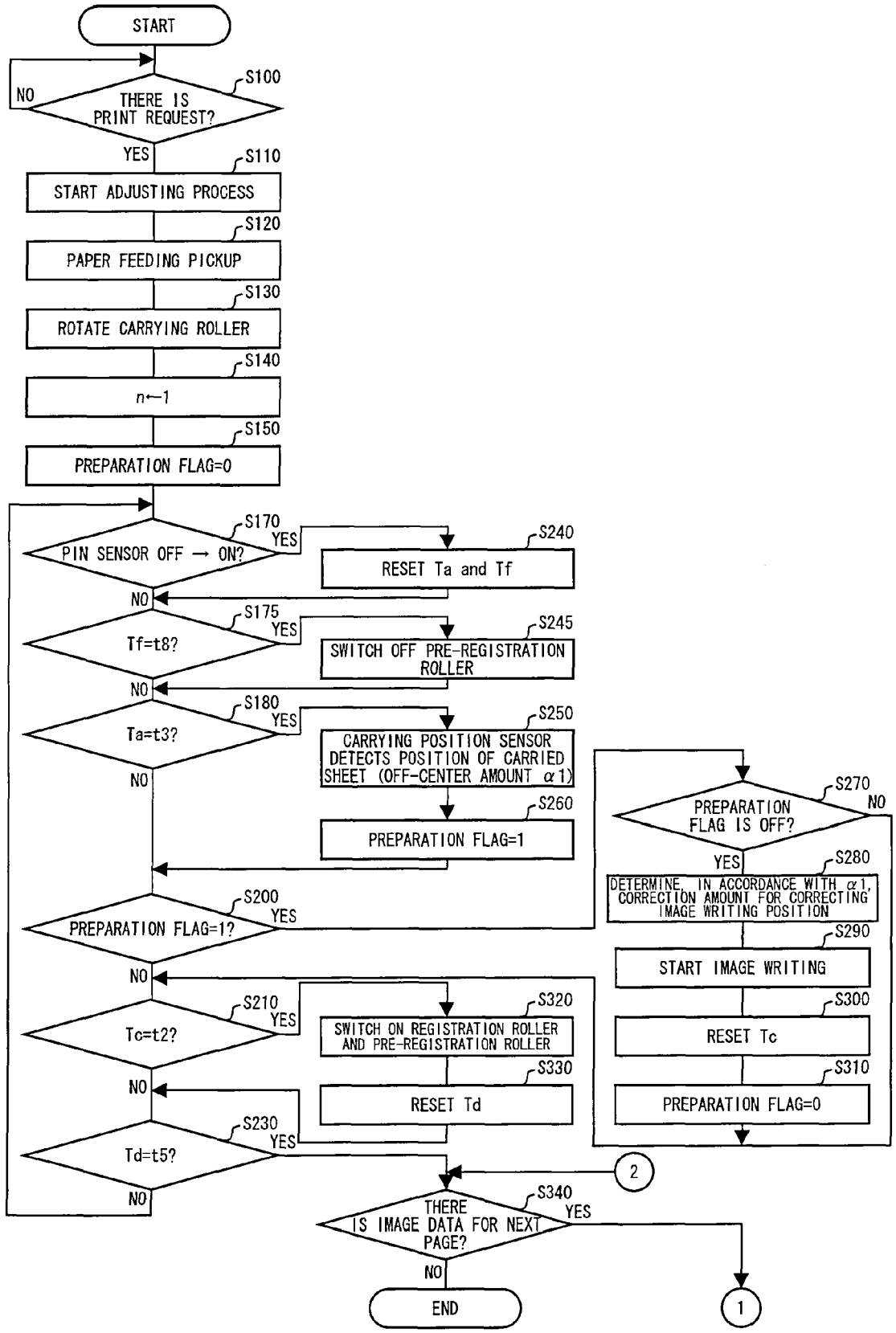
FIG. 11 is a flow chart illustrating a flow of an image forming process for the first sheet of recording paper.

The following describes a flow of the correcting process of correcting an image writing position, with reference to timing charts illustrated in FIGS. 9 and 10, and flow charts illustrated in FIGS. 11 through 14.

In FIGS. 9 and 10, the waveform "PAPER FEEDING PICKUP" represents a control action that the controlling section 101 performs on a pickup roller 80 of a paper feeding tray 25. "ON" indicates that the controlling section 101 causes the pickup roller 80 to pick up a sheet of recording paper; "OFF" indicates that the controlling section 101 stops the control action. The waveform "PIN SENSOR" represents the presence or absence of a sheet of recording paper as detected by the PIN sensor 71. "ON" indicates the presence of a sheet of recording paper; "OFF" indicates the absence of a sheet of recording paper. The waveform "TIMING OF IMAGE WRITING" represents timings of image writing onto the photoreceptor drum 17. "ON" indicates that image writing is carried out; "OFF" indicates that image writing is stopped. The waveforms "REGISTRATION ROLLER" and "PRE-REGISTRATION ROLLER" represent the presence or absence of rotation of the registration roller 29 and the pre-registration roller 72, respectively. "ON" indicates rotation; "OFF" indicates that the rotation is halted. Finally, the waveform "CIS SENSOR" represents timings at which the carrying position sensor 70 detects a position of a sheet of recording paper. "ON" indicates that the detection is being carried out.

First, the controlling section 101 determines whether or not a print request has been made (S100). Specifically, in a case where the operation panel 10 has received an instruction for a print request (e.g., in a case where a copy button has been pressed), or in a case where the image data communication unit 105 has received image data and a print request, the controlling section 101 determines that a print request has been made.

In a case where a print request has been made (YES in S100), the controlling section 101 starts adjusting processes necessary for carrying out image formation (S110). The adjusting processes encompass: preliminary rotation of the photoreceptor drum 17 and the developing tank 15b; the aforementioned control of the temperature of the fixing unit 23; the aforementioned image density adjusting process; the aforementioned raster process; etc. Each of the adjusting processes is separately controlled through time-sharing parallel processing of the controlling section 101. The controlling section 101 sets the adjustment flag to ON because the image formation process cannot be carried out while any of the adjusting processes is being carried out. The controlling section 101 sets the adjustment flag to OFF upon completion of all the adjusting processes.

The controlling section 101 also carries out Step S120 and subsequent steps in parallel with the adjusting processes.

In Step S120, the controlling section 101 causes a pickup roller 80 to operate to pick up a sheet of recording paper, and the sheet of recording paper is fed to the first paper carrying path 27. In order for the sheet of recording paper to be picked up, the controlling section 101 moves down the pickup roller 80 so that the pickup roller 80 makes contact with a surface of the sheet of recording paper for one second.

Then, the controlling section 101 causes the carrying rollers including the pre-registration roller 72 to start rotating (S130), except for the registration roller 29. In the following processes, the controlling section 101 only controls (i) the pickup operation of the pickup roller 80 and (ii) whether the registration roller 29 and the pre-registration roller 72 are rotated. As for other carrying rollers, the controlling section 101 keeps them rotating.

Then, the controlling section 101 substitutes 1 in a counter n that indicates the number of sheets of recording paper carried (S140). Then, the controlling section 101 substitutes 0 in a preparation flag (S150). Steps S170 through S230 are carried out in accordance with the waveforms of FIGS. 9 and 10 within a range indicated by "n=1".

When a sheet of recording paper is carried and the controlling section 101 detects a shift in output of the PIN sensor 71 from OFF (the absence of a sheet of recording paper) to ON (the presence of a sheet of recording paper) (YES in S170), the controlling section 101 resets Ta and Tf measured by a timer counter (S240). Thus, the timer counter starts measuring time at zero. That is, each of Ta and Tf indicates a period of time having elapsed since a point of time at which the output of the PIN sensor 71 shifted from OFF to ON.

In a case where Tf is equal in value to time t8 (YES in S175), the controlling section 101 halts the rotation of the pre-registration roller 72 (S245). The time t8 is set to take on a value corresponding to a period of time between a point of time at which a sheet of recording paper reaches the PIN sensor 71 and a point of time at which the sheet of recording paper reaches the registration roller 29. Therefore, the timing at which Tf becomes equal in value to the time t8 is a timing at which a sheet of recording paper reaches the registration roller 29.

Then, in a case where Ta is equal in value to time t3 (YES in S180), the controlling section 101 transmits, to the carrying position sensor 70, an instruction to carry out detection. Then, the carrying position sensor 70 finds an off-center amount $\alpha 1$ from a position of a side edge of a sheet of recording paper and a reference position $\alpha 0$, and then stores the off-center amount $\alpha 1$ in the memory 104 (S250). The time t3 is set to take on a value corresponding to a period of time between a point of time at which a sheet of recording paper is halted at the PIN sensor 71 and a point of time at which a shake of the sheet of recording paper due to the carriage is stopped.

Then, the controlling section 101 sets the preparation flag to 1 (S260). When set to 1, the preparation flag indicates a state in which a sheet of recording paper having arrived at the registration roller 29 can be sent to the transfer area 47 on the photoreceptor drum 17. In FIG. 9, the timing at which Step S260 is carried out is indicated by "t1" (t1>t3).

In a case where the preparation flag takes on a value of 1 (YES in S200), the controlling section 101 refers to the adjustment flag to determine whether the adjustment flag has been set to ON or OFF (S270). That is, the controlling section 101 determines whether or not the adjusting processes, which has been started in Step S110 and carried out in parallel, has been completed.

In a case where the adjustment flag has been set to ON (NO in S270), the controlling section 101 waits until the adjustment flag is set to OFF. This delays the start of image writing onto the photoreceptor drum 17. The delay time is indicated by t7 in FIGS. 9 and 10.

In contrast, in a case where the adjustment flag has been set to OFF, the controlling section 101 determines a correction amount $\beta 1$ by the equation $\beta 1 = \beta 0 + \alpha 1$ (S280) and the off-center amount $\alpha 1$ found in Step S250. The controlling section 101 controls the exposure unit 13 so that the exposure unit 13 starts image writing that is based the correction amount $\beta 1$ (S290). Then, the controlling section 101 resets Tc of the timer counter (S300). That is, Tc indicates a period of time having elapsed since a point of time of the start of image writing onto the photoreceptor drum 17. Then, the controlling section 101 resets the preparation flag to 0 (S310).

In a case where Tc is equal in value to time t2 (YES in S210), the controlling section 101 causes the registration roller 29 and the pre-registration roller 72 to rotate to carry a sheet of recording paper to the transfer area 47 (S320). The time t2 is set to take on such a value that a head of an image (including a margin) formed on the surface of the photoreceptor drum 17 is aligned with a head of the sheet of recording paper. Therefore, the head of the sheet of recording paper and the head of the image become aligned with each other. Then, the controlling section 101 resets Td of the timer counter (S330). That is, Td indicates a period of time having elapsed since a point of time at which the registration roller 29 and the pre-registration roller 72 started to rotate.

Thus, the process of writing an image onto the first sheet of recording paper is completed. As described above, as for the first sheet of recording paper, the correction amount is determined in accordance with the value of an output produced by the carrying position sensor 70 with respect to the first sheet of recording paper. This causes an image to be formed at a desired position on the sheet of recording paper. It should be noted, however, that in this case, the off-center amount $\alpha 1$ is found after the sheet of recording paper reaches the registration roller 29, and the correction amount is determined in accordance with the off-center amount $\alpha 1$. Therefore, the timing of the start of image writing onto the photoreceptor drum 17 cannot be set to be earlier than the timing of detection by the carrying position sensor 70. This causes the registration roller 29 to halt a sheet of recording paper for a long time period as shown in FIG. 9. However, the adjusting processes are carried out in the case of image formation with respect to the first sheet of recording paper. In general, the timing at which the adjusting processes are completed comes after the timing at which image wiring becomes ready after the correction amount is determined. In FIGS. 9 and 10, the adjusting processes allow for the delay time t7. Therefore, the timing of the start of image writing is not delayed due to the determination of the correction amount. As a result, the process of determining the correction amount in accordance with the off-center amount $\alpha 1$ does not adversely affect high-speed printing, and makes it possible to further improve accuracy of a position with which an image is formed on the first sheet of recording paper.

Then, in a case where Td is equal in value to time t5 (YES in S230), the controlling section 101 checks image data remaining in the memory 104 and determines whether or not there is image data for the next page (S340). In a case where there is no image data for the next page (NO in S340), the controlling section 101 terminates the process.

Figure 12:
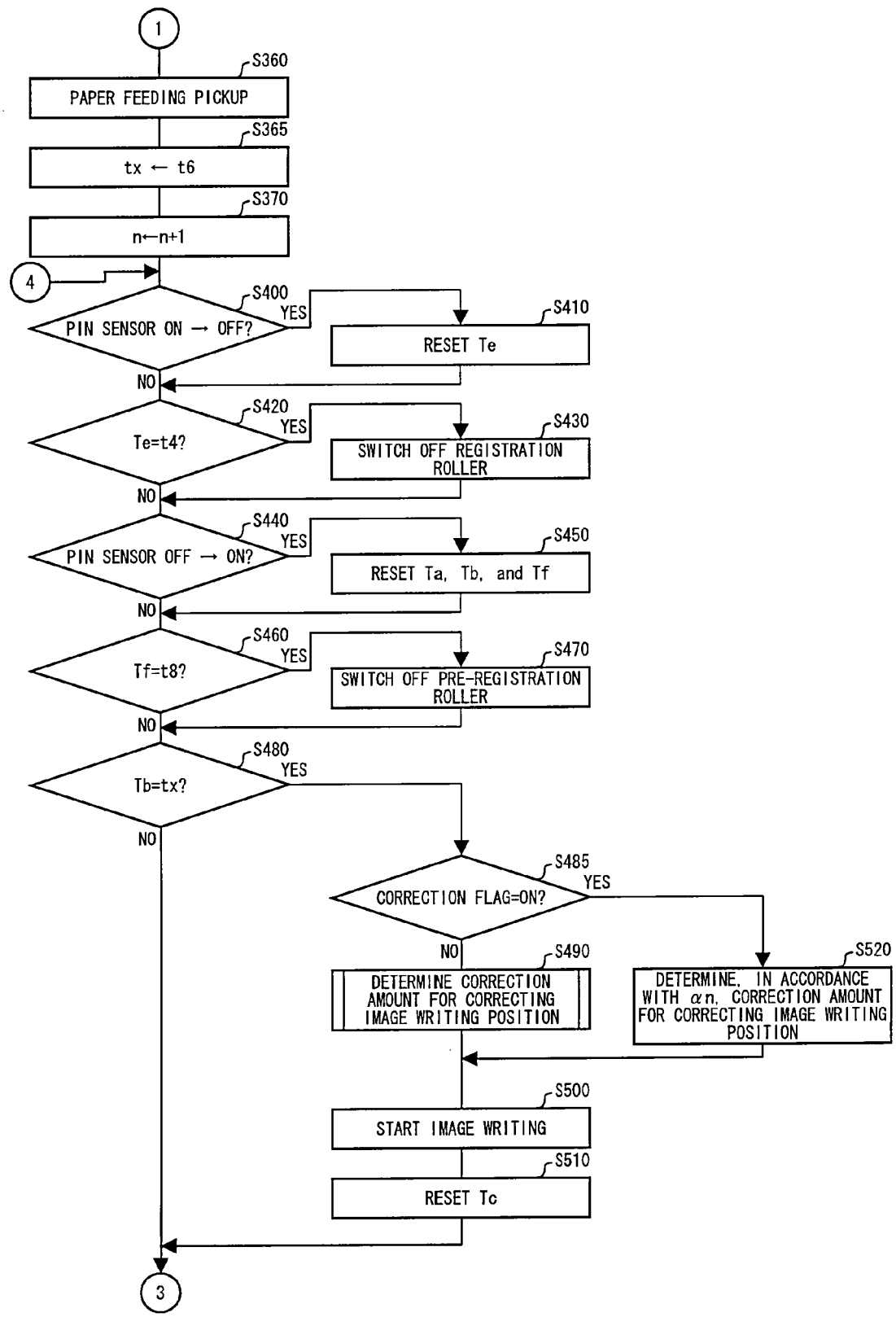
FIG. 12 is a flowchart illustrating the first half of a flow of an image forming process for the second or subsequent sheet of recording paper in continuous printing.

In a case where there is image data for the next page (YES in S340), the controlling section 101 carries out a process in accordance with the flow chart of FIG. 12.

First, the controlling section 101 drives the pickup roller 80 to pick up a sheet of recording paper from a paper feeding tray 25 (S360). Then, the controlling section 101 substitutes time t6 in a variable tx (S365). The time t6 is set as timing adjustment time between the timing of a shift in output of the PIN sensor 71 from OFF to ON and the timing of the start of image writing.

Then, the controlling section 101 adds 1 to the counter n, which indicates the number of pages carried (S370). At the time of Step S370, the previous sheet of recording paper is still being subjected to a transfer process. Therefore, a back end of the previous sheet of recording paper has not reached the PIN sensor 71 yet. The controlling section 101 waits until a shift in output of the PIN sensor 71 from ON to OFF (S400). In a case where the controlling section 101 detects a shift in output of the PIN sensor 71 from ON to OFF (YES in S400), the controlling section 101 resets Te of the timer counter. The timing at which Te is reset is a timing at which the back end of the previous sheet of recording paper has passed through the PIN sensor 71. Therefore, Te indicates a period of time having elapsed since the timing at which the back end of the previous sheet of recording paper passed through the PIN sensor 71.

In a case where Te is equal in value to time t4 (S420), the controlling section 101 halts the rotation of the registration roller 29 (S430). The time t4 is set to be a period of time slightly longer than a period of time between the timing at which a back end of a sheet of recording paper passes thorough the PIN sensor 71 and the timing at which the back end of the sheet of recording paper passes through the registration roller 29. This allows the controlling section 101 to halt the rotation of the registration roller 29 so that the next sheet of recording paper is halted at the registration roller 29 after the previous sheet of recording paper has completely passed through the registration roller 29.

When a head of the sheet of recording paper picked up from the paper feeding tray 25 in Step S360 reaches the PIN sensor 71 and the controlling section 101 detects a shift in output of the PIN sensor 71 from OFF to ON (YES in S440), the controlling section 101 resets Ta, Tb, and Tf of the timer counter (S450).

In a case where Tf is equal in value to time t8 (YES in S460), the controlling section 101 halts the rotation of the registration roller 72 (S470). Steps S460 and S470 of FIG. 12 are the same as Steps S175 and S245 of FIG. 11, respectively.

Then, the controlling section 101 determines whether or not Tb is equal in value to a value the variable tx (S480). In a case where Step S580, which is described later, is not carried out, the variable tx takes on a value of t6. In a case where Tb is equal in value to the time t6 (YES in S480), the controlling section 101 determines whether or not a correction flag has been set to ON (S485). The correction flag is a flag to be set in Step S580, which is described later. In a case where Step S580 has not been carried out yet, the correction flag has not been set to ON. In a case where the correction flag has not been set to ON (NO in S485), the controlling section 101 determines a correction amount by which an image writing position on the photoreceptor drum 17 is corrected (S490).

Figure 14:
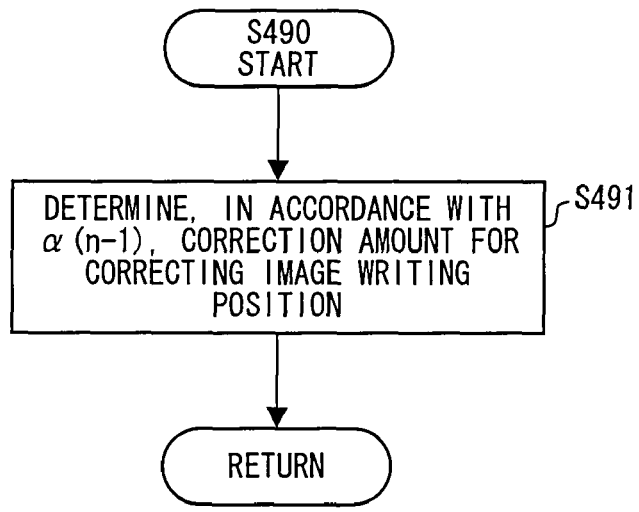
FIG. 14 is a flow chart illustrating a modification of Step S490 illustrated in FIG. 12.

FIG. 14 illustrates a flow of Step S490 in detail. As illustrated in FIG. 14, the controlling section 101 determines a correction amount βn by the equation βn=β0+α(n−1) with use of an off-center amount α(n−1) that is a difference between a position A(n−1) of a side edge of the previous sheet of recording paper and a reference position α0 (S491). Then, the controlling section 101 returns to the flow of FIG. 12 and controls the exposure unit 13 so that the exposure unit 13 starts image writing that is based on the correction amount βn (S500). Then, the controlling section 101 resets Tc of the timer counter (S510).

Figure 13:
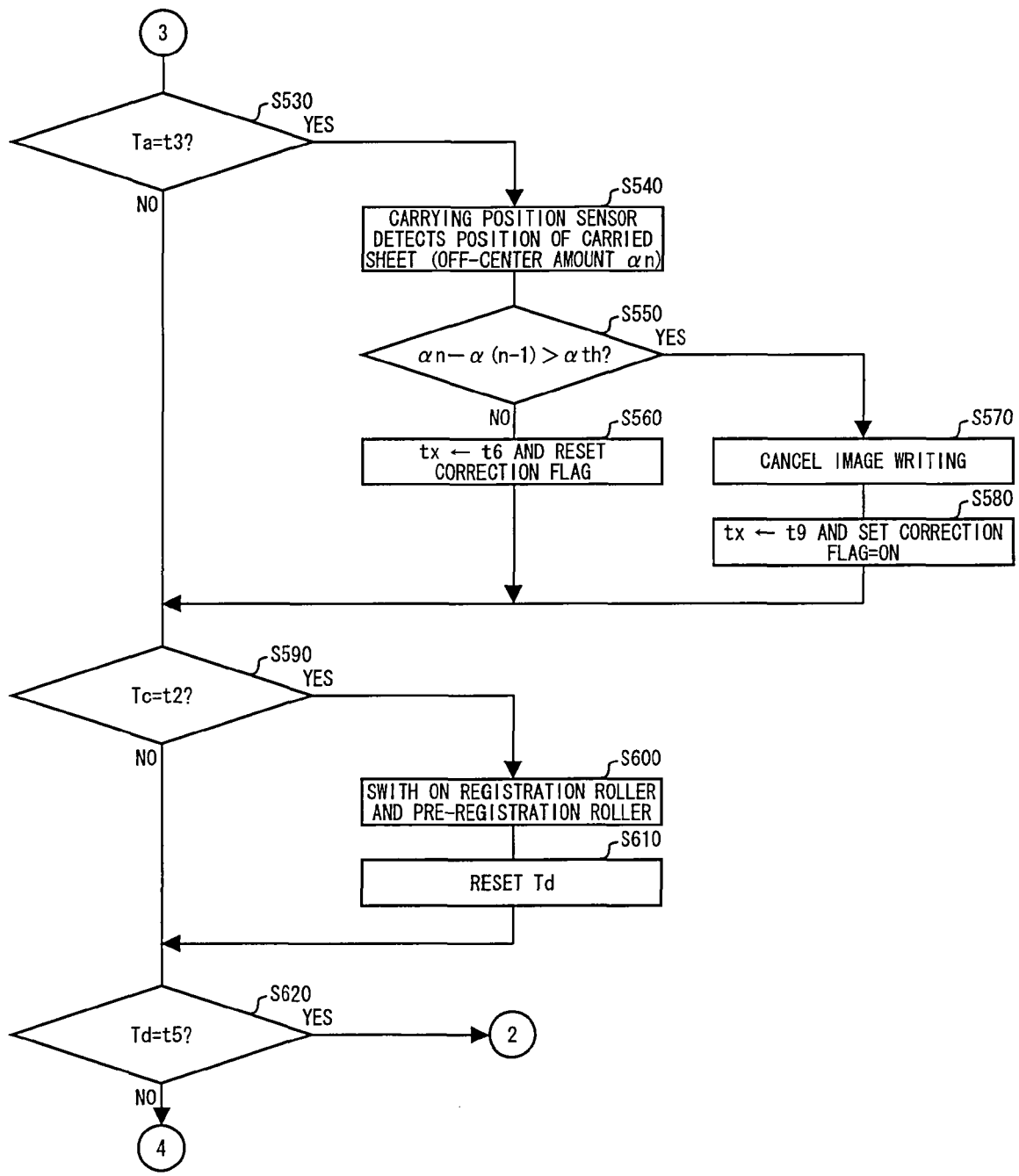
FIG. 13 is a flow chart illustrating the second half of the flow of the image forming process for the second or subsequent sheet of recording paper in the continuous printing.

Then, as illustrated in FIG. 13, in a case where Ta is equal in value to the time t3 (YES in S530), the controlling section 101 transmits, to the carrying position sensor 70, an instruction to carry out detection. Then, the carrying position sensor 70 finds an off-center amount αn from a position An of a side edge of the nth sheet of recording paper halted at the registration roller 29 and the reference position α0, and then stores the off-center amount αn in the memory 104 (S540).

Then, the controlling section 101 compares the absolute value Δα of the difference between the off-center amounts αn and α(n−1) with the threshold αth stored in the memory 104 (S550). In a case where the threshold αth is set for every paper feeding tray 25, specifically, the controlling section 101 reads out, from the memory 104, a threshold αth corresponding to the paper feeding tray 25 from which the sheet of recording paper was picked up in Step S360, and compares the absolute value Δα with the threshold αth thus read out.

In a case where the absolute value Δα is equal to or less than the threshold αth, the controlling section 101 continues to carry out the image writing process started in Step S500. Then, the controlling section 101 substitutes the time t6 in the variable tx, and resets the correction flag to OFF (S560).

In contrast, in a case where the absolute value Δα exceeds the threshold αth, the controlling section 101 stops the image writing process started in Step S500 (S570). That is, as indicated by arrows in FIG. 10, the controlling section 101 shifts the image writing by the exposure unit 13 from ON to OFF, and delays the timing of the rotation of the registration roller 29, the pre-registration roller 72, and the pickup roller 80. Then, the controlling section 101 substitutes time t9 in the variable tx, and sets the correction flag to ON (S580). The time t9 is set in advance to be such a period of time during which a toner image formed on the photoreceptor drum 17 in the image writing process started in S500 can be removed. The time t9 is a period of time obtained, for example, by adding the time t6 to the single cycle t0 of image formation in continuous printing. This makes it possible to prevent desynchronization of timings in operation of the sections of the image forming apparatus 11.

After the correction flag is set to ON in Step S580, NO is selected in each of Steps S590 and S620 since Tc and Td have not been reset yet. As a result, the process returns to Step S400 of FIG. 12. In a case where Tb is equal in value to the variable tx (in this case, the variable tx takes on the value of the time t9), the controlling section 101 determines in Step S485 that the correction flag has been set to ON. Then, the controlling section 101 determines a correction amount βn by the equation βn=β0+αn with use of the off-center amount αn detected in Step S540 with respect to the nth sheet of recording paper halted at the registration roller 29 (S520). Then, the controlling section 101 controls the exposure unit 13 so that the exposure unit 13 starts image writing that is based on the correction amount βn (S500). Then, the controlling section 101 resets Tc of the timer counter (S510).

When Tc becomes equal in value to the time t2 (YES in S590), the registration roller 29 and the pre-registration roller 72 start to rotate (S600), and Td of the timer counter is reset (S610). When Td becomes equal in value to the time t5 (YES in Step S620), the process returns to Step S340.

For the second or subsequent sheet of recording paper (i.e., n=2, 3, . . . ), as described above, the image writing position is corrected in accordance with an off-center amount α(n−1) detected with respect to the previous sheet of recording paper. Then, the exposure unit 13 starts an image writing process with respect to the photoreceptor drum 17. This make it possible to start an image writing process before an off-center amount is detected by the carrying position sensor 70 with respect to the sheet of recording paper to be subjected to the image writing process.

The image writing process is carried out after the image writing position is corrected in accordance with off-center amount α(n−1) detected with respect to the previous sheet of recording paper. Then, after an off-center amount αn is detected with respect to the sheet of recording paper to be subjected to the already-started image writing process, the predetermined threshold αth is compared with the absolute value Δα of a difference between the off-center amount αn and the off-center amount α(n−1), which has been used in the already-started image writing process.

In a case where the absolute value Δα is equal to or less than the threshold αth, the already-started image writing process is continued. This makes it possible to keep an amount of misalignment within an allowable range. In addition, this makes it possible to shorten a period of time for which a sheet of recording paper is halted at the registration roller 29, as indicated by "n=2" and "n=3" in FIG. 9. As a result, this allows high-speed printing.

In contrast, in a case where the absolute value Δα exceeds the threshold αth, as illustrated in FIG. 10, the already-started image writing process is stopped, and an image writing process is started after the image writing position is corrected in accordance with the off-center amount αn detected with respect to the sheet of recording paper to be subjected to the image writing process. This makes it possible to form an image without misalignment even on a sheet of recording paper having been accidentally misaligned.

(First Modification)

The above explanation assumes that Step S491 illustrated in FIG. 14 is carried out as Step S490 illustrated in FIG. 12. However, Step S490 is not limited to this, but may be carried out with use of off-center amounts detected with respect to sheets of recording paper up to the previous sheet of recording paper.

Figure 15:
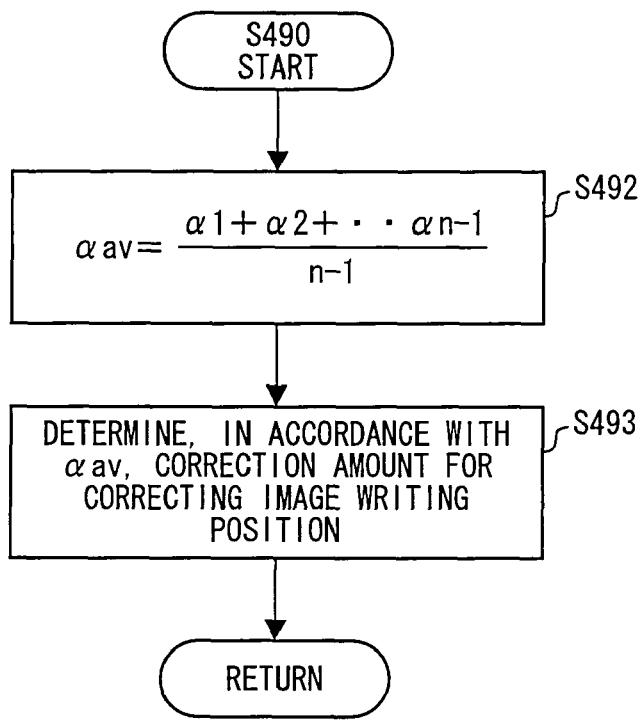
FIG. 15 is a flow chart illustrating another modification of Step S490 illustrated in FIG. 12.

FIG. 15 illustrates another modification of Step S490. As illustrated in FIG. 15, the controlling section 101 finds, by carrying out Steps S492 and S493, a correction amount by which an image writing position is corrected for the nth sheet of recording paper. That is, in Step S492, the controlling section 101 finds αav, which is an average of off-center amounts detected with respect to sheets of recording paper up to the previous sheet of recording paper, by the following equation:

$$\alpha av = (\alpha 1 + \alpha 2 + \ldots + \alpha(n-1))/(n-1).$$

Then, the controlling section 101 finds a correction amount βn by the equation βn=β0+αav (S493). The controlling section 101 thus finds a correction amount for the next sheet of recording paper in accordance with an average of off-center amounts detected with respect to sheets of recording paper from the first one to the previous one. This makes it possible to correct an image writing position in consideration of a trend of printed sheets of recording paper to be misaligned in continuous printing, and thereby prevent misalignment.

In this case, the controlling section 101 determines, in Step S550, whether or not an absolute value Δα of a difference between the off-center amount αn and the average off-center amount αav found in Step S490 exceeds the threshold αth.

(Second Modification)

Figure 16:
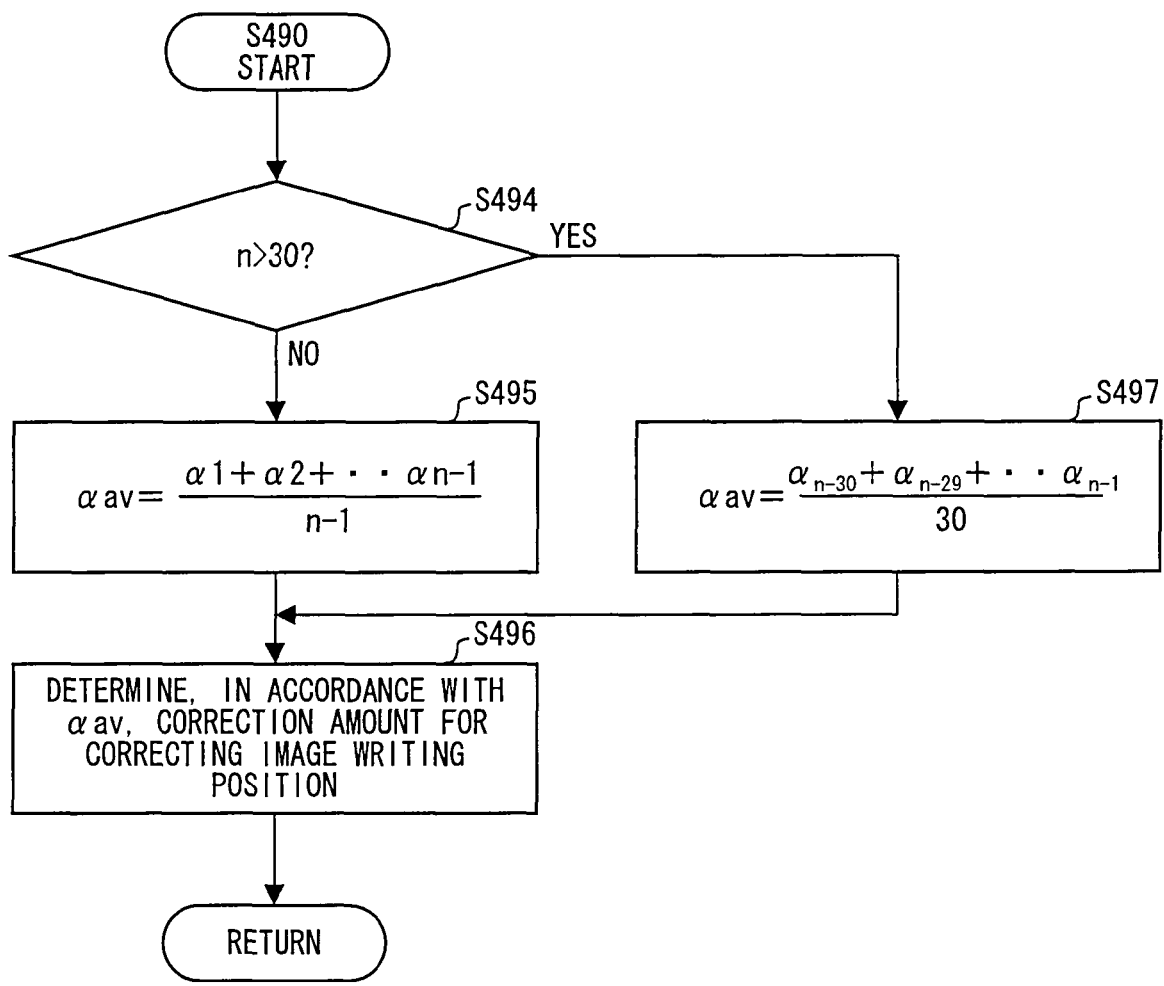
FIG. 16 is a flow chart illustrating still another modification of Step S490 illustrated in FIG. 12.

FIG. 16 illustrates still another modification of Step S490. As illustrated in FIG. 16, the controlling section 101 finds, by carrying out Steps S494 through S497, a correction amount by which an image writing position is corrected for the nth sheet of recording paper. That is, the controlling section 101 determines, in Step S494, whether or not the counter n, which indicates the number of pages carried, satisfies n>k (where k=30, but k is not limited to the value.). In a case where the counter n satisfies n≦30 (NO in Step S494), the controlling section 101 finds an average off-center amount αav by the following equation (S495):

$$\alpha av = (\alpha 1 + \alpha 2 + \ldots + \alpha(n-1))/(n-1).$$

Then, the controlling section 101 finds a correction amount βn by the equation βn=β0+αav (S496). In a case where the counter n satisfies n>30 (YES in Step S494), the controlling section 101 finds an average off-center amount αav by the following equation (S497):

$$\alpha av = (\alpha(n-30) + \alpha(n-29) + \ldots + \alpha(n-1))/30.$$

Then, the controlling section 101 finds a correction amount βn by the equation βn=β0+αav (S496).

The controlling section 101 thus finds a correction amount for the next sheet of recording paper in accordance with an average of off-center amounts detected with respect to 30 sheets of recording paper that have been printed most recently. This makes it possible to perform correction in consideration of a recent trend of printed sheets of recording paper to be misaligned in continuous printing and thereby prevent misalignment.

In this case, the controlling section 101 determines, in Step S550, whether or not an absolute value Δα of a difference between the off-center amount αn and the average off-center amount αav found in Step S490 exceeds the threshold αth.

(Third Modification)

As described above, an image writing process is stopped in case where the absolute value Δα exceeds the threshold αth. In this case, no sheet of recording paper is carried to the transfer mechanism 39. This raises the possibility that toner is transferred from the photoreceptor drum 17 to the transfer mechanism 39 and stains the transfer mechanism 39. In view of this, it is preferable that the controlling section 101 carries out the following process.

That is, in a case where the absolute value Δα exceeds the threshold αth, the controlling section 101 stops, in Step S570, the image writing process started in Step S500, and applies, to the elastic electrically-conductive roller 49 in the transfer mechanism 39, a voltage equal in polarity to the toner on the photoreceptor drum 17 (The polarity of the toner can be either positive or negative. The present modification assumes that the polarity of the toner is negative.), i.e., a voltage whose polarity causes the elastic electrically-conductive roller 49 to repel the toner. This makes it possible to prevent a toner image developed on the photoreceptor drum 17 in the image writing process started in Step S500 from being transferred onto the transfer belt 45. As a result, it is possible to reduce staining of the backside of a sheet of recording paper.

In this case, in Step S520, the controlling section 101 returns, to the polarity of an electric charge of the toner (i.e., the positive polarity), the polarity of a voltage to be applied to the elastic electrically-conductive roller 49.

(Fourth Modification)

As described above, in a case where the absolute value Δα exceeds the threshold αth, the controlling section stops the image writing process. In this case, adhesion of toner to an electrostatic latent image formed on the photoreceptor drum 17 leads to waste of toner. In view of this, it is preferable that the controlling section carries out the following process.

That is, in a case where the absolute value Δα exceeds the threshold αth, the controlling section 101 stops, in Step S570, the image writing process started in Step S500, and applies, to the developing roller 15a in the developing unit 15, a voltage opposite in polarity to the electrically-charged toner (The polarity of the toner can be either positive or negative. The present modification assumes that the polarity of the toner is negative.), i.e., a voltage whose polarity is positive. This makes it possible to prevent the toner from adhering to that portion of an electrostatic latent image formed in the image writing process started in Step S500 which has not reached the developing unit 15 yet. This makes it possible to reduce waste of toner.

In this case, in Step S520, the controlling section returns, to the same polarity as the electric charge of the toner (i.e., to the negative polarity), the polarity of a voltage to be applied to the developing roller 15*a*.

As described above, the image forming apparatus 11 includes: the photoreceptor drum (image bearing member) 17; the exposure unit (image writing section) 13 for writing an electrostatic latent image onto the photoreceptor drum 17; the transfer mechanism (transfer section) 39 for transferring, onto a sheet of recording paper an image obtained by developing with a developer the electrostatic latent image written onto the photoreceptor drum 17; the carrying position sensor (carrying position detecting section) 70 for detecting an amount of misalignment (an off-center amount) of a sheet of recording paper in the direction perpendicular to the carrying direction, on the paper carrying path 27 provided between the plurality of paper feeding trays 25, the manual paper feeding tray 75, or the large-capacity paper feeding cassette 73 (a paper feeding section), and the transfer mechanism 39; and the controlling section (the correcting section) 101 for correcting, in accordance with an off-center amount detected by the carrying position sensor 70, a position at which the exposure unit 13 writes an electrostatic latent image onto the photoreceptor drum 17.

In continuous printing of plural sheets of recording paper, the controlling section 101 corrects an image writing position for the first sheet of recording paper in accordance with the off-center amount $\alpha 1$ (the first amount of misalignment) detected by the carrying position sensor 70 with respect to the first sheet of recording paper. As for an nth sheet of recording paper (n is an integer of not less than 2), the controlling section 101 corrects an image writing position in accordance with the off-center amount $\alpha(n-1)$ (the second amount of misalignment) detected by the carrying position sensor 70 with respect to an (n−1)th sheet of recording paper, or in accordance with the average off-center amount $\alpha$av found from off-center amounts detected by the carrying position sensor 70 with respect to sheets of recording paper up to the (n−1)th sheet of recording paper.

In a case where the absolute value $\Delta\alpha$ of the difference between the off-center amount (the third amount of misalignment) an detected by the carrying position sensor 70 with respect to the nth sheet of recording paper, and the off-center amount $\alpha(n-1)$ or the average off-center amount $\alpha$av exceeds the threshold $\alpha$th, the controlling section 101 corrects the image writing position for the nth sheet of recording paper in accordance with the off-center amount an, and causes the exposure unit 13 to again write an electric latent image at the corrected image writing position, instead of writing the electrostatic latent image at the writing position corrected in accordance with the off-center amount $\alpha(n-1)$ or the average off-center amount $\alpha$av.

According to the arrangement, an image writing position for the first one of the sheets of recording paper to be continuously printed is corrected in accordance with the first amount of misalignment detected with respect to the first sheet of recording paper. This prevents an image from being misaligned on the first sheet of recording paper.

In contrast, an image writing position for the second or subsequent one of the sheets of recording paper to be continuously printed is corrected in accordance with the second amount of misalignment detected with respect to printed sheets of recording paper up to the previous sheet of recording paper. This allows a reduction in time until the start of image writing. As a result, this allows high-speed printing. In the case of continuous printing, generally, an amount of misalignment of a sheet of recording paper in the direction perpendicular to the carrying direction hardly varies between two sheets of recording paper that are sequentially carried. Therefore, in most cases, it is possible to form an image at a desired position on a sheet of recording paper even if an image writing position is corrected in accordance with an output produced by the carrying position detecting section with respect to the previous sheet of recording paper.

A sheet of recording paper may be accidentally misaligned when set in a paper feeding tray. In a case where such a sheet of recording paper is subjected to image writing at the image writing position corrected in accordance with the second amount of misalignment, there occurs misalignment.

According to the arrangement above, however, even if a sheet of recording paper having been accidentally misaligned is carried, an image can be formed without misalignment on the sheet of recording paper.

In a case where image writing is carried out at the writing position corrected in accordance with the off-center amount an, the image writing is started after the off-center amount $\alpha$n is detected with respect to a sheet of recording paper to be subjected to image formation. This makes it impossible to improve printing speed for that sheet of recording paper. However, such a situation is limited to only a case where the absolute value $\Delta\alpha$ exceeds the threshold $\alpha$th, i.e., a case where the sheet of recording paper has been accidentally greatly misaligned. That is, the number of sheets of recording paper for which printing speed cannot be improved is limited to the minimum number of sheets of recording paper required in order that respective image forming positions on all the sheets of recording paper fall within an allowable range.

The arrangement above thus makes it possible to form an image without misalignment even on a sheet of recording paper having been accidentally misaligned, and to minimize a decrease in printing speed.

Finally, each block of the image forming apparatus 11 or, in particular, the controlling section 101 may be constituted by hardware, or may be realized by software with use of a CPU as follows:

The image forming apparatus 11 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the image forming apparatus 11 a computer-readable storage medium containing control program code (executable program, intermediate code program, or source program) for the image forming apparatus 11, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The image forming apparatus 11 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth®, 802.11 wireless, HDR, mobile telephone network, satellite line, or terrestrial digital network. The present invention encompasses computer data signals embedded in a carrier wave, which computer data signals are the program code embodied through electronic transmission.

As described above, the image forming apparatus of the present invention includes: an image bearing member; an image writing section for writing an electrostatic latent image onto the image bearing member; a transfer section for transferring, onto a sheet of recording paper, an image obtained by developing with a developer the electrostatic latent image written onto the image bearing member; a carrying position detecting section for detecting, on a recording-paper carrying path provided between a paper feeding section for feeding a sheet of recording paper and the transfer section, an amount of misalignment of a sheet of recording paper in a direction perpendicular to a carrying direction; and a correcting section for correcting, in accordance with an amount of misalignment detected by the carrying position detecting section, a writing position at which the image writing section writes an electrostatic latent image onto the image bearing member, in continuous printing of plural sheets of recording paper, the correcting section (i) correcting the writing position for a first sheet of recording paper in accordance with a first amount of misalignment detected by the carrying position detecting section with respect to the first sheet of recording paper, and (ii) correcting the writing position for an nth sheet of recording paper (where n is an integer of not less than 2) in accordance with a second amount of misalignment detected by the carrying position detecting section with respect to the sheets of recording paper up to an (n−1)th sheet of recording paper, wherein, in a case where an absolute value of a difference between (a) a third amount of misalignment detected by the carrying position detecting section with respect to the nth sheet of recording paper and (b) the second amount of misalignment exceeds a threshold, the correcting section corrects the writing position for the nth sheet of recording paper in accordance with the third amount of misalignment and causes the image writing section to again write an electrostatic latent image at the writing position corrected in accordance with the third amount of misalignment, instead of writing an electrostatic latent image at the writing position corrected in accordance with the second amount of misalignment.

According to the arrangement, a writing position for the first one of the sheets of recording paper to be continuously printed is corrected in accordance with the first amount of misalignment detected with respect to the first sheet of recording paper. This prevents an image from being misaligned on the first sheet of recording paper.

In contrast, a writing position for the second or subsequent one of the sheets of recording paper to be continuously printed is corrected in accordance with the second amount of misalignment detected with respect to printed sheets of recording paper up to the previous sheet of recording paper. This allows a reduction in time until the start of image writing. As a result, this allows high-speed printing. In the case of continuous printing, generally, an amount of misalignment of a sheet of recording paper caused in the direction perpendicular to the carrying direction hardly varies between two sheets of recording paper that are sequentially carried. Therefore, in most cases, it is possible to form an image at a desired position on a sheet of recording paper even if a writing position is corrected in accordance with an output produced by the carrying position detecting section with respect to the previous sheet of recording paper.

A sheet of recording paper may be accidentally misaligned when set in a paper feeding tray. In a case where such a sheet of recording paper is subjected to image writing at a writing position corrected in accordance with the second amount of misalignment, there occurs misalignment.

According to the arrangement above, however, in a case where the absolute value of the difference between the third amount of misalignment detected by the carrying position detecting section with respect to the nth sheet of recording paper and the second amount of misalignment exceeds the threshold, the correcting section (i) stops the image writing section from writing an electrostatic latent image at the writing position corrected in accordance with the second amount of misalignment, (ii) corrects the writing position in accordance with the third amount of misalignment, and (iii) causes the image writing section to again write an electrostatic latent image at the corrected writing position corrected in accordance with the third amount of misalignment. The threshold is set in advance as an upper limit of an allowable range of misalignment of an image to be formed on a sheet of recording paper. The case where the absolute value of the difference between the third amount of misalignment and the second amount of misalignment exceeds the threshold means that an image written onto an accidentally misaligned sheet of paper in accordance with the second amount of misalignment goes beyond the allowable range of misalignment. In such a case, the correcting section corrects the writing position not in accordance with the second amount of misalignment but in accordance with the third amount of misalignment, and causes the image writing section to again write an electrostatic latent image. Therefore, even if a sheet of recording paper having been accidentally misaligned is carried, an image can be formed without misalignment on the sheet of recording paper.

In a case where image writing is carried out at the writing position corrected in accordance with the third amount of misalignment, the image writing is started after an amount of misalignment is detected with respect to a sheet of recording paper to be subjected to image formation. This makes it impossible to improve printing speed for that sheet of recording paper. However, such a situation is limited to only a case where an absolute value of a difference between the third amount of misalignment and the second amount of misalignment exceeds the threshold, i.e., a case where the sheet of recording paper has been accidentally greatly misaligned. That is, the number of sheets of recording paper for which printing speed cannot be improved is limited to the minimum number of sheets of recording paper required in order that respective image forming positions on all the sheets of recording paper fall within an allowable range.

The arrangement above thus makes it possible to form an image without misalignment even on a sheet of recording paper having been accidentally misaligned, and to minimize a decrease in printing speed.

It is preferable that the image forming apparatus of the present invention further includes a registration roller for aligning (i) a head of an image formed on the image bearing member with (ii) a head of a sheet of recording paper, and the carrying position detecting section detects an amount of misalignment of a sheet of recording paper upstream from the registration roller.

According to the arrangement, the carrying position detecting section can detect an amount of misalignment of a sheet of recording paper halted by the registration roller. This improves accuracy in detection of an amount of misalignment. The registration roller is generally positioned immediately upstream from the image bearing member. As such, the carrying position detecting section is provided in the vicinity of the image bearing member. As a result, the carrying position detecting section can detect almost the same amount of misalignment of a sheet of recording paper as that measured at the transfer section.

Furthermore, in the image forming apparatus of the present invention, the correcting section preferably corrects the writing position for the nth sheet of recording paper (where n is an integer of not less than 2) in accordance with an amount of misalignment detected by the carrying position detecting section with respect to the (n−1)th sheet of recording paper.

This arrangement makes it possible to easily carry out a correcting process of correcting a writing position.

Further, in the image forming apparatus of the present invention, the correcting section may correct the writing position for the nth sheet of recording paper (where n is an integer of not less than 2) in accordance with an average of amounts of misalignment detected by the carrying position detecting section with respect to the plural sheets of recording paper up to the (n−1)th sheet of recording paper.

The arrangement improves the reliability of a correction amount because the writing position is corrected in accordance with an average of amounts of misalignment of plural sheets of recording paper.

Further, in the image forming apparatus of the present invention, the correcting section may correct the writing position for the nth sheet of recording paper (where n is an integer of not less than 2) in accordance with an average of amounts of misalignment detected by the carrying position detecting section with respect to sheets of recording paper from the (n−k)th sheet of recording paper (where k is a predetermined integer of not less than 2) to the (n−1)th sheet of recording paper.

The arrangement makes it possible to perform correction in consideration of a recent trend of misalignment in continuous printing. This makes it possible to further prevent misalignment.

The image forming apparatus of the present invention is preferably arranged such that, in the continuous printing of the plural sheets of recording paper, the plural sheets of recording paper are subjected to image formation with synchronization timing at intervals of a predetermined period of time; and, when the absolute value of the difference between the third amount of misalignment and the second amount of misalignment exceeds the threshold and the predetermined period of time has elapsed since a point of time at which the image writing section started to write an electrostatic latent image at the writing position corrected in accordance with the second amount of misalignment, the correcting section causes the image writing section to start to write an electrostatic latent image at the writing position corrected in accordance with the third amount of misalignment.

The predetermined period of time corresponds to an interval between timings at which sheets of recording paper are picked up from a paper feeding section in continuous printing without any troubles. The sections of the image forming apparatus operate in accordance with the synchronization timing.

The arrangement makes it possible to prevent desynchronization of timings in operation of the sections of the image forming apparatus.

The image forming apparatus of the present invention is preferably arranged such that the transfer section is a transfer section to which a transfer voltage is applied so that an image developed with the developer is transferred onto a sheet of recording paper, and preferably, the image forming apparatus further includes a first voltage controlling section for applying, in a case where the absolute value of the difference exceeds the threshold, to the transfer section a voltage equal in polarity to an electric charge of the developer on the image bearing member.

As described above, according to the present invention, in a case where the absolute value of the difference exceeds the threshold, the correcting section stops the image writing section from writing an electrostatic latent image at the writing position corrected in accordance with the second amount of misalignment. In this case, the electrostatic latent image formed at the writing position corrected in accordance with the second amount of misalignment may be developed with the developer. According to the arrangement of the present invention, however, a voltage equal in polarity to an electric charge of the developer on the image bearing member is applied to the transfer section in a case where the absolute value of the difference exceeds the threshold. Since this causes the transfer section to have the same polarity as the developer, the transfer section repels the developer. This makes it possible to prevent the developer from adhering to the transfer section. As a result, it is possible to reduce staining of the backside of a sheet of recording paper.

In addition to the arrangement above, the image forming apparatus of the present invention preferably includes: a developing section for developing, when a voltage is applied to the developing section, with the developer the electrostatic latent image written onto the image bearing member; and a second voltage controlling section for applying, in a case where the absolute value of the difference exceeds the threshold, to the developing section a voltage opposite in polarity to an electric charge of the developer.

According to the present invention, as described above, in a case where the absolute value of the difference exceeds the threshold, the correcting section stops the image writing section from writing an electrostatic latent image at the writing position corrected in accordance with the second amount of misalignment. In this case, developing with the developer an electrostatic latent image formed at the writing position corrected in accordance with the second amount of misalignment leads to waste of the developer. According to the arrangement, however, a voltage opposite in polarity to an electric charge of the developer is applied to the developing section in a case where the absolute value of the difference exceeds the threshold. Since this cause the developing section to be opposite in polarity to the developer, the developer adheres to the developing section. This prevents the developer from being supplied from the developing section to the image bearing member. This makes it possible to reduce waste of the developer.

In addition to the arrangement above, it is preferable that the image forming apparatus of the present invention further includes a plurality of paper feeding sections for feeding sheets of recording paper, wherein the threshold can be set for each of the plurality of paper feeding sections.

There is a case where a user sets, in a given paper feeding section selected from a plurality of paper feeding sections, a sheet of recording paper having an image formed only on one side thereof (i.e., a printed sheet of recording paper). In this case, the user sets the sheet of recording paper in the paper feeding section so that the other side on which no image has been formed is subjected to printing. In most cases, the formation of an image on such a printed recording paper does not require alignment with high accuracy.

According to the arrangement, in view of this, the threshold can be set for each of the plurality of paper feeding sections. This makes it possible to set the threshold high for a paper feeding section for holding sheets of recording paper that do not require alignment with very high accuracy. This makes it possible to reduce the frequency of image writing that is in accordance with the third amount of misalignment, thereby realizing a further increase in speed.

The present invention allows high-speed printing and improves accuracy of a position with which an image is printed on a sheet of recording paper. As such, the present invention is applicable to an image forming apparatus such as a printer or a multifunction printer.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An image forming apparatus comprising:
    an image bearing member;
    an image writing section for writing an electrostatic latent image onto the image bearing member;
    a transfer section for transferring, onto a sheet of recording paper, an image obtained by developing with a developer the electrostatic latent image written onto the image bearing member;
    a carrying position detecting section for detecting, on a recording-paper carrying path provided between a paper feeding section for feeding a sheet of recording paper and the transfer section, an amount of misalignment of a sheet of recording paper in a direction perpendicular to a carrying direction; and
    a correcting section for correcting, in accordance with an amount of misalignment detected by the carrying position detecting section, a writing position at which the image writing section writes an electrostatic latent image onto the image bearing member,
    in continuous printing of plural sheets of recording paper, the correcting section (i) correcting the writing position for a first sheet of recording paper in accordance with a first amount of misalignment detected by the carrying position detecting section with respect to the first sheet of recording paper, and (ii) correcting the writing position for an nth sheet of recording paper (where n is an integer of not less than 2) in accordance with a second amount of misalignment detected by the carrying position detecting section with respect to the sheets of recording paper up to an (n−1)th sheet of recording paper, wherein
    in a case where an absolute value of a difference between (a) a third amount of misalignment detected by the carrying position detecting section with respect to the nth sheet of recording paper and (b) the second amount of misalignment exceeds a threshold, the correcting section corrects the writing position for the nth sheet of recording paper in accordance with the third amount of misalignment and causes the image writing section to again write an electrostatic latent image at the writing position corrected in accordance with the third amount of misalignment, instead of writing an electrostatic latent image at the writing position corrected in accordance with the second amount of misalignment.

2. The image forming apparatus as set forth in claim 1, further comprising a registration roller for aligning (i) a head of an image formed on the image bearing member with (ii) a head of a sheet of recording paper, wherein
    the carrying position detecting section detects the amount of misalignment of a sheet of recording paper upstream from the registration roller.

3. The image forming apparatus as set forth in claim 1, wherein the correcting section uses, as the second amount of misalignment, an amount of misalignment detected by the carrying position detecting section with respect to the (n−1)th sheet of recording paper.

4. The image forming apparatus as set forth in claim 1, wherein the correcting section uses, as the second amount of misalignment, an average of amounts of misalignment detected by the carrying position detecting section with respect to the plural sheets of recording paper up to the (n−1)th sheet of recording paper.

5. The image forming apparatus as set forth in claim 1, wherein the correcting section uses, as the second amount of misalignment, an average of amounts of misalignment detected by the carrying position detecting section with respect to sheets of recording paper from the (n−k)th sheet of recording paper (where k is a predetermined integer of not less than 2) to the (n−1)th sheet of recording paper.

6. The image forming apparatus as set forth in claim 1, wherein:
    in the continuous printing of the plural sheets of recording paper, the plural sheets of recording paper are subjected to image formation with synchronization timing at intervals of a predetermined period of time; and
    when the absolute value of the difference between the third amount of misalignment and the second amount of misalignment exceeds the threshold and the predetermined period of time has elapsed since a point of time at which the image writing section started to write an electrostatic latent image at the writing position corrected in accordance with the second amount of misalignment, the correcting section causes the image writing section to start to write an electrostatic latent image at the writing position corrected in accordance with the third amount of misalignment.

7. The image forming apparatus as set forth in claim 1, wherein the transfer section is a transfer section to which a transfer voltage is applied so that an image developed with the developer is transferred onto a sheet of recording paper,
    the image forming apparatus further comprising a first voltage controlling section for applying, in a case where the absolute value of the difference exceeds the threshold, to the transfer section a voltage equal in polarity to an electric charge of the developer on the image bearing member.

8. The image forming apparatus as set forth in claim 1, further comprising:

a developing section for developing, when a voltage is applied to the developing section, with the developer the electrostatic latent image written onto the image bearing member; and a second voltage controlling section for applying, in a case where the absolute value of the difference exceeds the threshold, to the developing section a voltage opposite in polarity to an electric charge of the developer.

9. The image forming apparatus as set forth in claim 1, further comprising a plurality of paper feeding sections for feeding sheets of recording paper, wherein the threshold can be set for each of the plurality of paper feeding sections.

* * * * *